United States Patent [19]

Borrelli et al.

[11] Patent Number: 4,710,430
[45] Date of Patent: Dec. 1, 1987

[54] COLORED PHOTOCHROMIC GLASSES AND METHOD

[75] Inventors: Nicholas F. Borrelli, Elmira; George B. Hares, Corning; Dennis W. Smith, Corning; Brent M. Wedding, Corning, all of N.Y.

[73] Assignee: Corning Glass Works, Corning, N.Y.

[21] Appl. No.: 729,965

[22] Filed: May 3, 1985

Related U.S. Application Data

[60] Division of Ser. No. 650,846, Sep. 17, 1984, Pat. No. 4,537,612, which is a continuation-in-part of Ser. No. 364,472, Apr. 1, 1982, abandoned.

[51] Int. Cl.$^4$ ................................................. C03C 4/06
[52] U.S. Cl. ..................................... 428/432; 501/13; 430/962
[58] Field of Search ........................ 501/13; 428/432; 430/DIG. 962

[56] References Cited

U.S. PATENT DOCUMENTS

| | | | |
|---|---|---|---|
| 2,779,136 | 1/1957 | Hood et al. | 501/68 |
| 3,208,860 | 9/1965 | Armistead et al. | 501/62 |
| 3,656,923 | 4/1972 | Garfinkel et al. | 501/13 |
| 3,790,430 | 2/1974 | Mochel | 501/68 |
| 4,018,965 | 4/1977 | Kerko et al. | 501/13 |
| 4,118,214 | 10/1978 | Wedding | 501/13 |
| 4,125,405 | 11/1978 | Araujo et al. | 501/13 |
| 4,190,451 | 2/1980 | Hares et al. | 501/13 |
| 4,191,547 | 3/1980 | Wu | 501/13 |
| 4,240,836 | 12/1980 | Borrelli et al. | 501/13 |
| 4,284,686 | 8/1981 | Wedding | 501/13 |
| 4,358,542 | 11/1982 | Hares et al. | 501/13 |
| 4,537,612 | 8/1985 | Borrelli et al. | 501/13 |
| 4,567,104 | 1/1980 | Wu | 428/410 |

FOREIGN PATENT DOCUMENTS 604837  4/1978  U.S.S.R. ................................. 501/13

Primary Examiner—Mark L. Bell
Assistant Examiner—A. Knab
Attorney, Agent, or Firm—C. S. Janes, Jr.

[57] ABSTRACT

This invention is directed to a method for modifying the coloration produced in a silver halide-containing photochromic glass when heat treating the glass at a temperature not exceeding 450° C. under reducing conditions. The method comprises subjecting such a glass having a base composition which contains at least 1% by weight $Li_2O$, at least 2% by weight $Na_2O$, and at least 6% by weight $Li_2O+Na_2O+K_2O$ to an ion exchange reaction, wherein lithium ions, and potassium ions, when the latter are present in the composition, in the glass surface are exchanged with sodium ions from an external source, prior to the reduction heat treatment.

2 Claims, 19 Drawing Figures

COLORED PHOTOCHROMIC GLASSES AND METHOD

This is a division of application Ser. No. 650,846, filed Sept. 17, 1984, now U.S. Pat. No. 4,537,612, which is a continuation-in-part of application Ser. No. 364,472, filed Apr. 1, 1982 and now abandoned.

BACKGROUND OF THE INVENTION

This invention concerns photochromic glasses. More particularly, it concerns a method of controlling and adjusting a permanent surface coloration, developed by heat treatment in the presence of a reducing agent, in a photochromic glass article containing a silver halide as a photochromic agent. Another aspect is the article thus produced.

Characteristically, photochromic glasses darken upon exposure to actinic radiation, particularly ultraviolet light, and fade or lighten upon removal of the activating radiation. Thus far, commercial applications for these glasses have been principally in the fields of ophthalmic and sunglass lenses. The commercially significant glasses employ one or more selected silver halide(s) as their active ingredient, and were first described by Armistead et al. in U.S. Pat. No. 3,208,860.

Since that time, silver halide-containing, photochromic glasses that exhibit improved darkening and fading characteristics have been developed. One such family of glasses is described by G. B. Hares et al. in U.S. Pat. No. 4,190,451.

Photochromic glasses are also known that possess non-neutral coloration by transmitted light in the undarkened state. Glass bodies, in which such coloration is developed throughout the body, may be produced by the addition of known light-absorbing colorants in the initial glass melt.

Alternatively, photochromic glasses may have permanent coloration imparted in a surface layer by a reduction heat treatment. U.S. Pat. Nos. 3,892,582 and 3,920,463 (Simms) disclose such a procedure. The patents teach that pink, yellow and brown colors may be developed by firing, in a reducing atmosphere, an article formed from certain silver halide-containing photochromic glasses.

Photochromic glasses, having a yellow color imparted by the procedure described in the Simms' patents, have been produced commercially. The surface color development is attributed to an absorption band caused by the precipitation of metallic silver in the glass during heat treatment. In silver-containing glasses free of other precipitated phases, the silver absorption band is manifested as an absorption peak centered at about 400–410 nm in the violet region of the spectrum. In the reduction-fired, photochromic glasses reported in the aforementioned Simms patents, which contain precipitated silver halide in addition to silver in the matrix glass, absorption peaks are reported in the blue region of the spectrum between about 430–460 nm.

The hue and intensity of the induced color in prior art glasses probably depended upon the position and intensity of the treatment-induced absorption peak. The deepest yellow colors were caused by strong absorption peaks at 430 to 460 nm, while the light pink color is now thought to have been caused by the same fundamental absorption peak as it first appeared in weak form at about 500 nm following a mild heat treatment.

U.S. Pat. No. 4,240,836 (Borrelli et al.) discloses surface-colored photochromic glass articles exhibiting a wide range of colors in the undarkened state. The colors range from blue to orange, red and purple, and are the result of inducing absorption peaks at longer wave lengths above 460 nm, and frequently in the 510–580 nm range. A primary condition in the Borrelli et al. procedure is restricting the temperature of the heat treatment in a reducing atmosphere to not over 450° C. This minimizes possible melting of the photochromic phase (silver halide) during the reduction step.

PURPOSES OF THE INVENTION

The color development procedure disclosed in the Borrelli et al. patent has a great deal of commercial potential, particularly for photochromic sunglass products. One such product which seems especially beneficial for automobile drivers is Corning Code 8133, commercially marketed by Corning Glass Works, Corning, N.Y. as the copper-colored Serengeti ® Driver photochromic sunglass. Unfortunately, not all photochromic glasses will exhibit this desirable color after being heat treated in a reducing atmosphere.

The general purpose of the invention is to provide a method whereby the coloration after reduction of certain of the latter-mentioned photochromic glasses may be altered to a more desirable color.

A further purpose is to extend the range of glass composition in which a particular shade and/or intensity of coloration may be modified.

Another purpose is to provide a modification and extension of the procedure disclosed in the Borrelli et al. patent.

Another purpose is to provide a means for changing the coloration that can be imparted to a given photochromic glass under a given set of thermal reduction conditions.

A still further purpose is to provide a process capable of producing a gradient or stepped coloration across a surface.

A specific purpose is to provide an ophthalmic or sunglass photochromic lens having a permanent, controlled, surface coloration, and a method of producing such lens.

Another specific purpose is to provide an ophthalmic or sunglass photochromic lens having a permanent surface coloration of a stepped or gradient nature, and a method of producing such article.

SUMMARY OF THE INVENTION

The invention is an improved method of producing a permanent coloration in a surface zone on a photochromic glass article wherein a silver halide is the photochromic agent, wherein the glass composition contains an alkali metal oxide selected from the group of $Na_2O$, $Li_2O$ and mixtures thereof, and wherein the glass is heat treated at a temperature not exceeding about 450° C. under reducing conditions, preferably under flowing gaseous reducing conditions, for a time at least sufficient to modify the light absorbing characteristics of the article surface, the improvement comprising shifting the content of said alkali metal oxide in at least a portion of the surface coloration zone of the glass in order to shift correspondingly the absorption characteristics imparted to the article during the thermal reduction treatment. The improvement is accomplished by an ion exchange between sodium ions from an external source with lithium ions in the glass surface prior to reduction.

Where K$_2$O is present in the glass composition, there may also be an exchange of sodium ions with potassium ions. In both reactions the Na$^+$ ions replace Li$^+$ and K$^+$ ions on a one-for-one basis.

The invention further comprehends the articles resulting from the improved method.

PRIOR LITERATURE

In addition to the patents previously noted, brief reference is made to the following:

U.S. Pat. No. 4,118,214 (Wedding) describes a method of producing a variety of colors in a silver halide-containing glass by a combination of exposure to high energy radiation, heat treatment, and exposure to a reducing atmosphere at a temperature of at least 350° C. This is a very different procedure that produces distinctly different color effects.

U.S. Pat. No. 4,125,405 (Araujo et al.) describes red, silver halide-containing glasses which are slightly photochromic, and which are produced by melting the glass under reducing conditions. These glasses do not have adequate photochromicity for commercial use.

U.S. Pat. No. 4,018,965 (Kerko et al.) discloses silver halide-containing, lithium boroaluminosilicate glasses which exhibit excellent photochromic properties after heat treatment, and which are chemically strengthenable by ion exchange procedures.

U.S. Pat. No. 4,358,542 (Hares et al.) discloses compositions which display improved photochromic properties over those disclosed in U.S. Pat. No. 4,018,965; i.e., the glasses exhibit a deeper darkening transmittance and a more rapid fade rate.

U.S. Pat. No. 3,790,430 (Mochel) and No. 2,779,136 (Hood et al.), respectively, provide typical disclosures of sodium ion-for-lithium ion exchange, and, conversely, lithium ion-for-sodium ion exchange. Reference may also be made to U.S. Pat. No. 2,075,446 which shows exchange of silver or copper ions for alkali metal ions. In the case of copper ions, a subsequent reducing treatment changes color, but is taught to have no effect on the amber color produced by silver ions.

U.S. Pat. No. 3,656,923 (Garfinkel et al.) describes the chemical strengthening of silver-containing photochromic glasses through the exchange of Li$^+$ ions in the base glass composition with Na$^+$ ions.

U.S. Pat. No. 4,191,547 (Wu) provides a method for making photosensitive colored glasses exhibiting photoanisotropic effects through the exchange of Na$^+$ and/or K$^+$ ions in the base glass composition with Ag$^+$ ions.

Therefore, whereas ion exchange reactions in glass articles were well known to the art, there was no disclosure of the utility of a Na$^+$-for-Li$^+$ and, if K$_2$O is present in the glass, a Na$^+$-for-K$^+$ ion exchange to alter the color displayed by silver halide-containing photochromic glasses when heated in a hydrogen atmosphere in accordance with U.S. Pat. No. 4,240,836.

GENERAL DESCRIPTION

Figure 1:
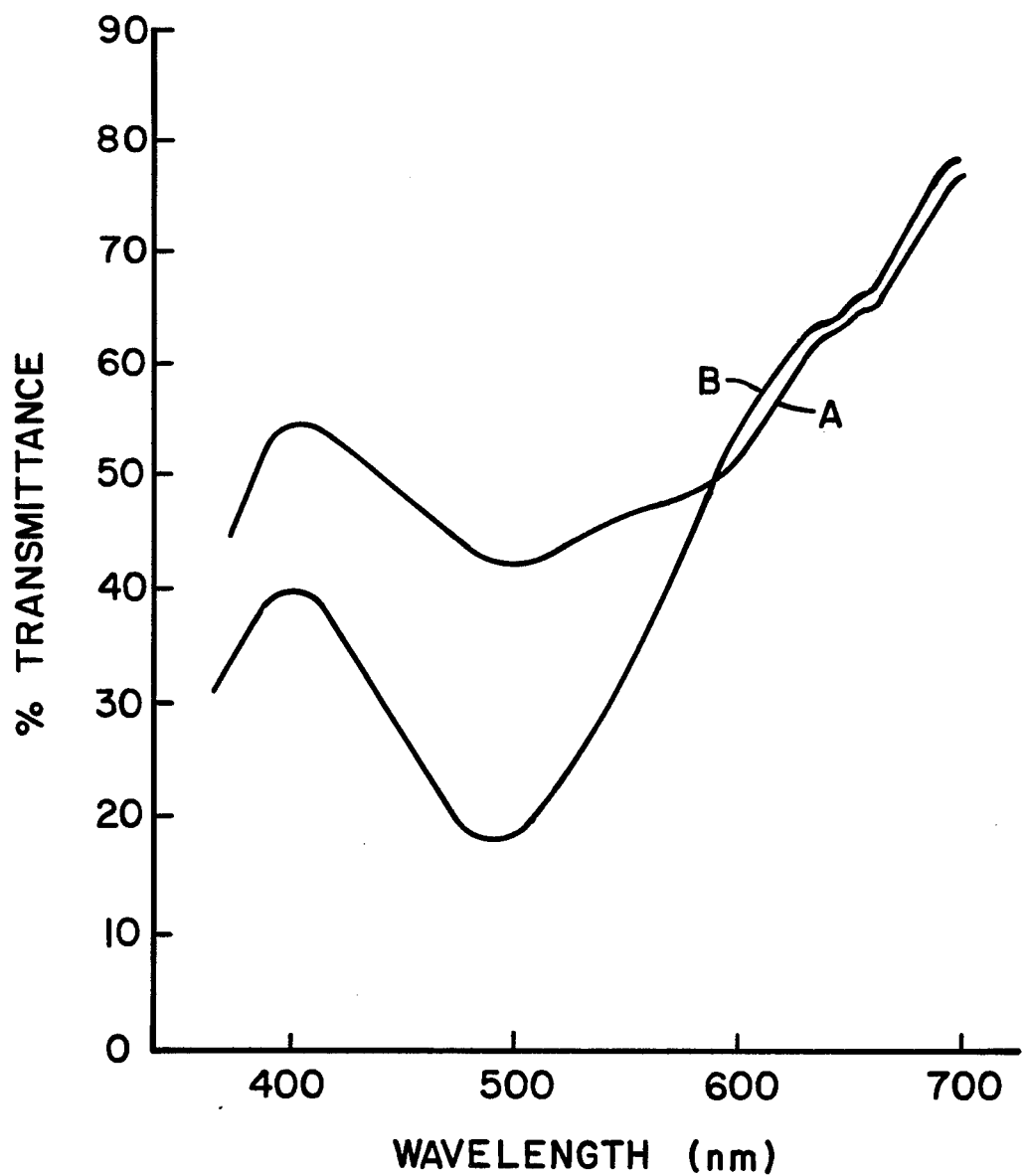
FIGS. 1-19 depict transmittance curves as measured on a spectrophotometer. Percent transmittance is plotted along the vertical axis versus wavelength in nanometers along the horizontal axis.

The present invention represents an extension of the method disclosed in Borrelli et al., U.S. Pat. No. 4,240,836. Hence, the process steps and material disclosures of that patent are equally applicable here, and the patent is incorporated herein in its entirety. In general, the patent describes exposing a silver halide-containing photochromic glass article to a flowing gaseous reducing atmosphere at a temperature not exceeding about 450° C. The exposure is for a time sufficient to induce a permanent coloration due to the development during heat treatment of strong absorption bands in the glass surface, centered at wavelengths above 460 nm and frequently in the range of 510-580 nm, which shift the hue of the glass out of the yellow and into the orange, red, violet or blue regions of the spectrum.

The patent teaches that it is very difficult to provide orange, red, purple and/or blue coloration when heat treating temperatures substantially above 450° C. are employed. Thus, in an exemplary glass, use of temperatures above 450° C. caused an absorption peak at 510 nm to shift over to become a peak at about 450 nm. The result was a glass lighter and more yellow in color. Accordingly, heat treating temperatures in the range of 200°-450° C. are recommended, and that recommendation is equally applicable to the present invention. A preferred temperature range is 350°-425° C.

The patent discloses that a variety of known reducing gases may be employed to induce surface coloration during heat treatment. These include hydrogen (H$_2$), forming gas (e.g., a 95% N$_2$+5% H$_2$ by volume mixture), carbon monoxide, and H$_2$—N$_2$ mixtures produced by cracking ammonia. Such gaseous mixtures are preferred for present purposes as well.

The patent indicates that silver halide-containing glasses, in general, may be employed. However, a preference is expressed for glasses disclosed in U.S. Pat. No. 4,190,451 (Hares et al.). Those glasses consist essentially, in weight percent, of about 0-2.5% Li$_2$O, 0-9% Na$_2$O, 0-17% K$_2$O, 0-6% Cs$_2$O, 8-20% Li$_2$O+Na$_2$O+K$_2$O+Cs$_2$O, 14-23% B$_2$O$_3$, 5-25% Al$_2$O$_3$, 0-25% P$_2$O$_5$, 20-65% SiO$_2$, 0.004-0.02% CuO, 0.15-0.3% Ag, 0.1-0.25% Cl, and 0.1-0.2% Br, wherein the molar ratio of alkali metal oxides:B$_2$O$_3$ ranges between about 0.55-0.85 and the weight ratio Ag:(Cl+Br) ranges between about 0.65-0.95. As also noted in the Hares et al. disclosure, such glasses may additionally contain, as optional constituents, up to about 10% total of other selected oxides or elements for known purposes, including up to about 6% ZrO$_2$, up to about 3% TiO$_2$, up to about 0.5% PbO, up to about 7% BaO, up to about 4% CaO, up to about 3% MgO, up to about 6% Nb$_2$O$_5$, up to about 4% La$_2$O$_3$, and up to about 2% F; and up to 1% total of transition metal oxides and/or up to 5% total of rare earth metal oxides as colorants.

Finally, the patent suggests that base glass composition, as well as prior thermal history, may have an important effect on the surface coloration obtained. Thus, it notes different effects achieved with two different photochromic glasses. However, it provides no indication regarding the effect of individual components in the compositions.

The present invention provides a method of altering the surface composition of a photochromic glass in such a way as to produce absorption bands in the 510-580 nm range, when fired under reducing conditions according to the teachings of the Borrelli et al. patent, in certain glass compositions wherein those absorption bands would be absent after being processed according to the Borrelli et al. patent. Such a glass is exemplified by Example 7 in the Borrelli et al. patent.

For certain glass compositions this surface alteration can be accomplished by exchanging sodium ions for lithium ions and, if $K_2O$ is present in the glass compositions, with potassium ions in the glass matrix either before or after the photochromic heat treatment. This type of ion exchange may be carried out at temperatures too low or times too short to be of beneficial use in chemically strengthening the ware. A convenient exchange medium is molten $NaNO_3$ maintained at about 325°–450° C., preferably at 400° C. Immersion in the salt bath for five minutes is sufficient to produce a desired alteration of the reduction color. Longer times can be useful to develop further colors.

Not all photochromic glasses can have the absorption altered in this manner. Corning Code 8097 is affected only slightly and then only at very low temperatures for the reduction cycle. That glass has the following approximate analysis reported below in weight percent:

| | | | |
|---|---|---|---|
| $SiO_2$ | 55.6 | PbO | 5.0 |
| $B_2O_3$ | 16.4 | $ZrO_2$ | 2.2 |
| $Al_2O_3$ | 8.9 | Ag | 0.16 |
| $Li_2O$ | 2.65 | CuO | 0.035 |
| $Na_2O$ | 1.85 | Cl | 0.24 |
| $K_2O$ | 0.01 | Br | 0.145 |
| BaO | 6.7 | F | 0.19 |
| CaO | 0.2 | | |

While it would be advantageous commercially not to require the preliminary ion exchange step to obtain the absorption bands in the 510–580 nm region upon reduction, manufacturing or photochromism requirements may necessitate compositions which need to be ion exchanged. Such is the case for the compositions disclosed in U.S. Pat. No. 4,018,965 (Kerko et al.) and U.S. Pat. No. 4,358,542 (Hares et al.) which are manufactured in the form of drawn sheet.

The glass compositions disclosed in U.S. Pat. No. 4,018,965 consist essentially, expressed in terms of weight percent on the oxide basis, of:

| | | | |
|---|---|---|---|
| $SiO_2$ | 54–66 | $Li_2O + Na_2O + K_2O$ | 6–16 |
| $Al_2O_3$ | 7–15 | Ag | 0.1–1 |
| $B_2O_3$ | 10–25 | Cl | 0.1–1 |
| PbO | 0–3 | Br | 0–3 |
| $Li_2O$ | 0.5–4 | F | 0–2.5 |
| $Na_2O$ | 3.5–15 | Transition metal oxide colorants | 0–1 |
| $K_2O$ | 0–10 | Rare earth metal oxide colorants | 0–5 |

The glass compositions disclosed in U.S. Pat. No. 4,358,542 consist essentially, expressed in terms of weight percent on the oxide basis, of:

| | | | |
|---|---|---|---|
| $SiO_2$ | 55–60 | PbO | 0.1–0.25 |
| $Al_2O_3$ | 9–10 | Ag | 0.1–0.15 |
| $B_2O_3$ | 19–20.5 | Cl | 0.3–0.5 |
| $Li_2O$ | 2–2.5 | Br | 0.05–0.15 |
| $Na_2O$ | 2–3 | CuO | 0.0065–0.01 |
| $K_2O$ | 6–7 | | |

In general, glass compositions operable in the present invention will contain, by weight, at least 1% $Li_2O$, at least 2% $Na_2O$, and at least 6% $Li_2O+Na_2O+K_2O$. Such glasses can be chemically strengthened via the conventional large ion-for-small ion exchange reaction, e.g., a $K^+$ ion-for-$Na^+$ ion exchange and/or a $Na^+$ ion-for-$Li^+$ ion exchange, at temperatures below the strain point of the glass after the reduction treatment.

The coloration of the reduced photochromic glass articles will shift towards the yellow when heated, either in a salt bath or in air, to a temperature higher than that of the reduction temperature. Consequently, suitable color compensation must be made during the reduction process if a specific coloration is to be obtained after chemical strengthening.

The use of lithium or potassium salt baths to alter the surface composition of the glass prior to the reduction treatment is detrimental. Such use results in a shift of the absorption bands to shorter wavelengths, thereby imparting a yellow coloration to the glass. However, because of the much more rapid rate of diffusion of $Na^+$ ions with respect to $K^+$ ions, we have found that a salt bath of mixed $NaNO_3$-$KNO_3$, e.g., 40% by weight $NaNO_3$ and 60% by weight $KNO_3$, can be used.

Another feature of the ion exchange procedure is the capability of producing a gradient or a stepped variation across the surface of a glass article. Thus, a glass lens, for example, may be immersed in a salt bath for ion exchange and then slowly withdrawn to provide a constantly changing degree of ion exchange. Alternatively, the lens may be withdrawn in two or more steps to provide bands or sections of different colors after reduction.

It will be appreciated that the depth to which the color change is effected will depend upon the depth of the alkali ion exchange. In particular, the time and temperature of the ion exchange may be sufficiently limited such that the depth of ion exchange is less than the depth of coloration effected during the subsequent thermal reduction treatment, thereby resulting in two layers of coloration. Hence, this embodiment of the invention will produce a color overlay which will be different from either the original or the completely altered color produced by the reduction heat treatment. For example, this may occur if the ion exchange is limited to about half the effective depth of the thermal reduction treatment. The unaltered zone then may be expected to retain its original color, whereas the ion exchanged overlay will be different.

DESCRIPTION OF PREFERRED EMBODIMENTS

EXAMPLE 1

During the course of the commercial production of a potentially photochromic glass in the form of sheet for use in forming simultaneously heat treated and sagged photochromic sunglass lenses in the manner generally described in U.S. Pat. No. 4,088,470 (Bourg et al.), samples of the glass sheet were obtained therefrom. As employed herein, the expression "potentially photochromic glass" is defined as a glass which, as initially formed from a molten batch, does not evidence photochromism to any substantial degree; but which, after an appropriate heat treatment, will exhibit photochromic behavior. The sheet glass had the following approximate composition, expressed in terms of weight percent on the oxide basis:

| | | | |
|---|---|---|---|
| $SiO_2$ | 59.3 | PbO | 0.135 |
| $B_2O_3$ | 19.7 | Cl | 0.35 |
| $Al_2O_3$ | 9.6 | Br | 0.077 |
| $Li_2O$ | 2.2 | CuO | 0.006 |
| $Na_2O$ | 2.4 | NiO | 0.073 |
| $K_2O$ | 6.3 | $Co_3O_4$ | 0.030 |
| Ag | 0.15 | | |

The nickel and cobalt oxides were present to impart a permanently-fixed gray tint to the glass.

The samples of glass were separated into two groups. One group was immersed into a bath of molten 100% $NaNO_3$ operating at 400° C. for a period of 16 hours to effect an ion exchange between the $Na^+$ ions from the molten bath and $Li^+$ ions and $K^+$ ions where present in the surface of the glass to a depth of several microns. The second group of samples was not so treated.

Both groups of samples were placed on a metal surface and heated at 625° C. for 15 minutes in a box furnace to simulate the heat treatment schedule utilized when photochromic lenses are formed via the simultaneous heat treatment-sagging process.

Thereafter, both groups of samples were exposed to a flowing atmosphere of hydrogen at 360° C. for 40 minutes. The colors exhibited by the two sets of samples were distinctly different. The group subjected to the ion exchange reaction manifested a purple coloration whereas the untreated specimens demonstrated an orange hue.

The purple tint is caused by the appearance of new absorption band around 570 nm. Curve A in FIG. 1 depicts percent transmittance as a function of wavelength for the samples which had been immersed into the bath of molten $NaNO_3$ before being exposed to the heat treatment to develop photochromism therein. Curve B records percent transmittance as a function of wavelength for the specimens which had not been subjected to the salt bath treatment.

EXAMPLE 2

Another sample of the glass sheet described above in Example 1 was similarly heat treated in a box furnace at 625° C. for five minutes to develop photochromism therein. The sample was then partially immersed in the bath of molten $NaNO_3$ operating at 400° C. for a period of one hour. The specimen was removed from the salt bath, rinsed with water, dried, and thereafter exposed to an atmosphere of flowing hydrogen for 40 minutes at 360° C.

The portion of the specimen which had been immersed into the bath displayed a purplish hue due to the development of an absorption band in the region of 520-540 nm, whereas that part of the sample which had remained above the bath evidenced an orange shade because of the absence of absorption bands in the 500-600 nm range of the spectrum.

Figure 2:
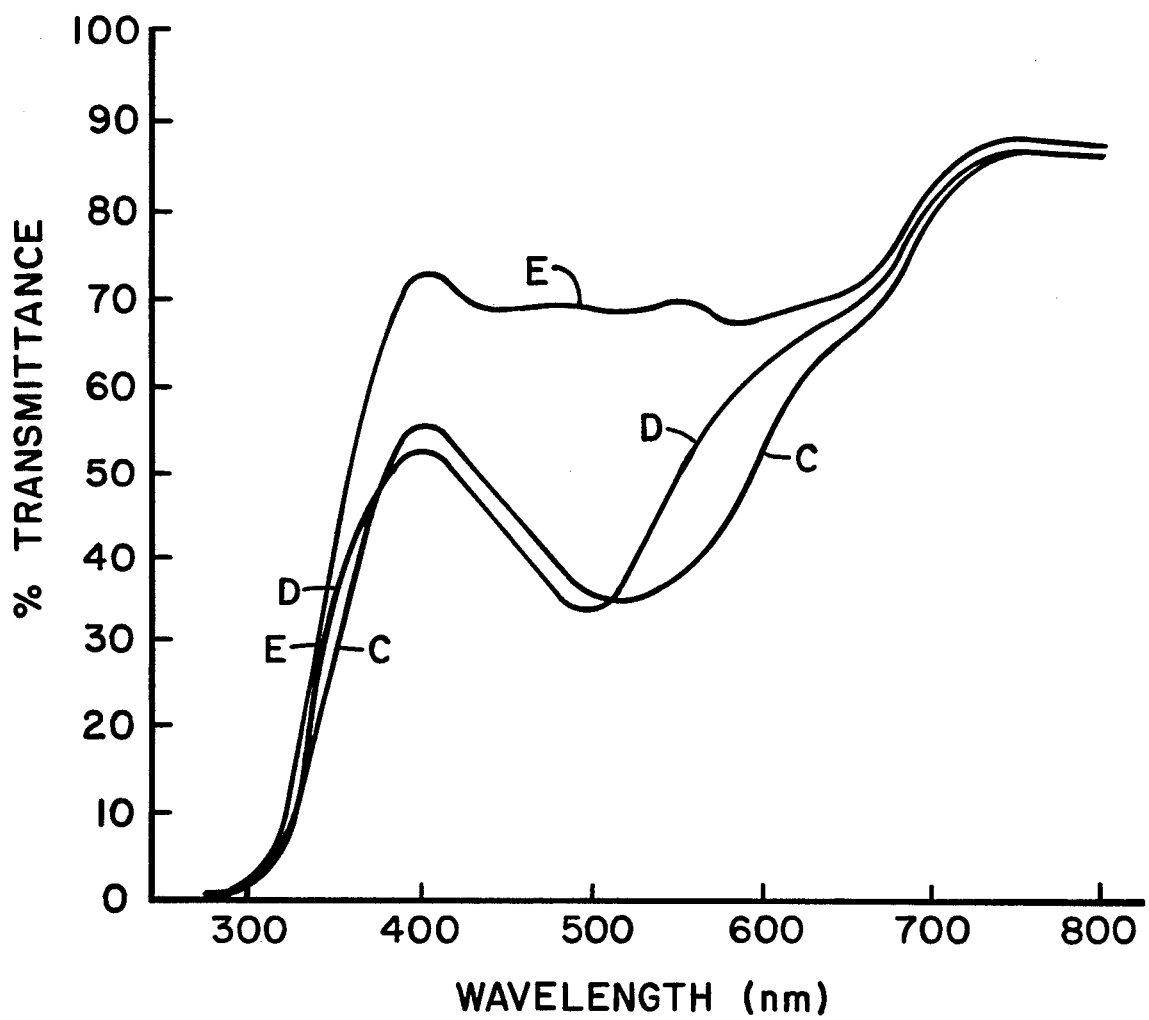

Curve C of FIG. 2 portrays percent transmittance as a function of wavelength for that section of the specimen treated in the salt bath, and Curve D percent transmittance as a function of wavelength for that area of the sample not so treated. Curve E illustrates percent transmittance as a function of wavelength for a sample of the above-described glass sheet which had not been subjected to either the ion exchange treatment or the firing in the hydrogen atmosphere.

A comparison of Curve A of FIG. 1 and Curve C of FIG. 2 indicates that, surprisingly, there is very little difference in the hue of the final coloration whether the glass has been exposed to the molten salt bath before or after the heat treatment designed to develop photochromism. Example 2 also provides a method for making two-tone or gradient colored lenses by not immersing the entire lens into the molten salt.

EXAMPLE 3

Lens blanks prepared from glass sheet of the composition tabulated above in Example 1, and which had been made photochromic through a commercial simultaneous heat treatment-sag process, were immersed into a bath of molten $NaNO_3$ operating at 400° C. for one hour. After removal from the bath, rinsing, and drying, each lens blank was exposed separately and at a different temperature to an atmosphere of flowing hydrogen for a period of 40 minutes. Curves F, G, H, I, and J of FIG. 3 report percent transmittances as a function of wavelength for lens blanks fired in hydrogen at 360° C., 380° C., 400° C., 420° C., and 440° C., respectively. Those curves clearly indicate that hydrogen firing at lower temperatures favors the formation of absorption bands in the 510-550 nm region of the spectrum. However, the intensity of the purple coloration decreases as the temperature is lowered.

EXAMPLE 4

Figure 4:
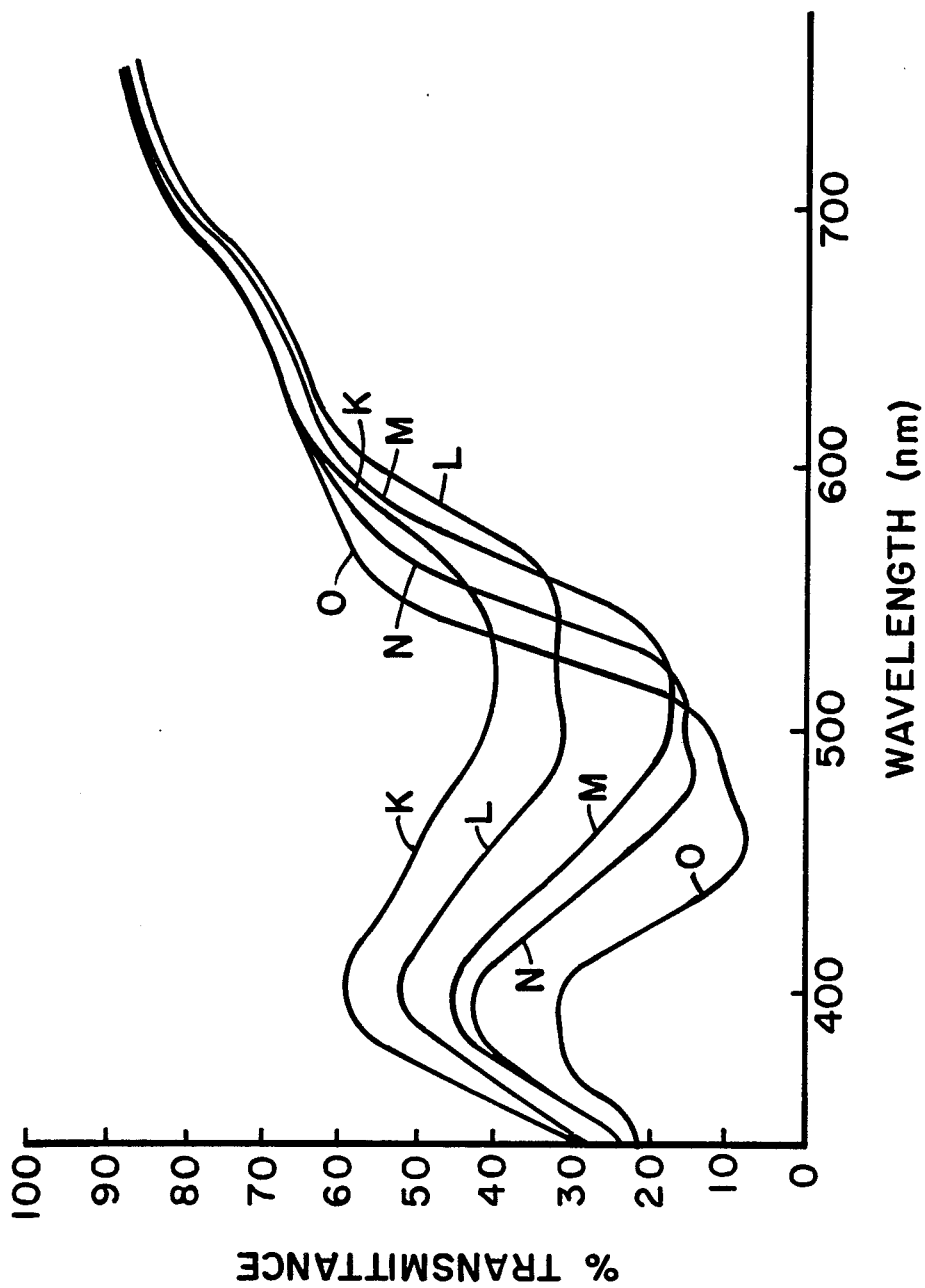

The colored lens blanks prepared in Example 3 were immersed for 16 hours into a bath of molten salt consisting of 40% by weight $NaNO_3$ and 60% by weight $KNO_3$ operating at 400° C. to simulate a commercial schedule for chemically strengthening glass articles. Curves K, L, M, N, and O of FIG. 4 depict percent transmittances as a function of wavelength measured on those specimens. A comparison of those curves with Curves F, G, H, I, and J, respectively, indicates that the chemical strengthening caused little change in the absorption characteristics of the lens blanks colored in accordance with Example 3.

EXAMPLE 5

Lens blanks were prepared from glass sheet, marketed commercially as Corning Code 8102, having the composition tabulated below in weight percent which had been made photochromic through a commercial simultaneous heat treatment-sag process:

| | | | |
|---|---|---|---|
| $SiO_2$ | 58.6 | Ag | 0.3 |
| $B_2O_3$ | 17.5 | Cl | 0.37 |
| $Al_2O_3$ | 11.5 | Br | 0.13 |
| PbO | 2.2 | F | 0.22 |
| $Li_2O$ | 2.0 | CuO | 0.025 |
| $Na_2O$ | 6.7 | NiO | 0.041 |
| $K_2O$ | 1.5 | $Co_3O_4$ | 0.029 |

The NiO and $Co_3O_4$ were again included to lend a permanent, neutral gray tint to the glass.

The blanks were immersed into a bath of molten $NaNO_3$ operating at 400° C. for one hour. After removal from the bath of molten salt, the blanks were rinsed with water, dried, and individually fired in a hydrogen atmosphere for 40 minutes at various temperatures. Curves P, Q, R, S, and T of FIG. 5 record percent transmittances as a function of wavelength for lens blanks fired in hydrogen at 360° C., 380° C., 400° C., 420° C., and 440° C., respectively.

Figure 3:
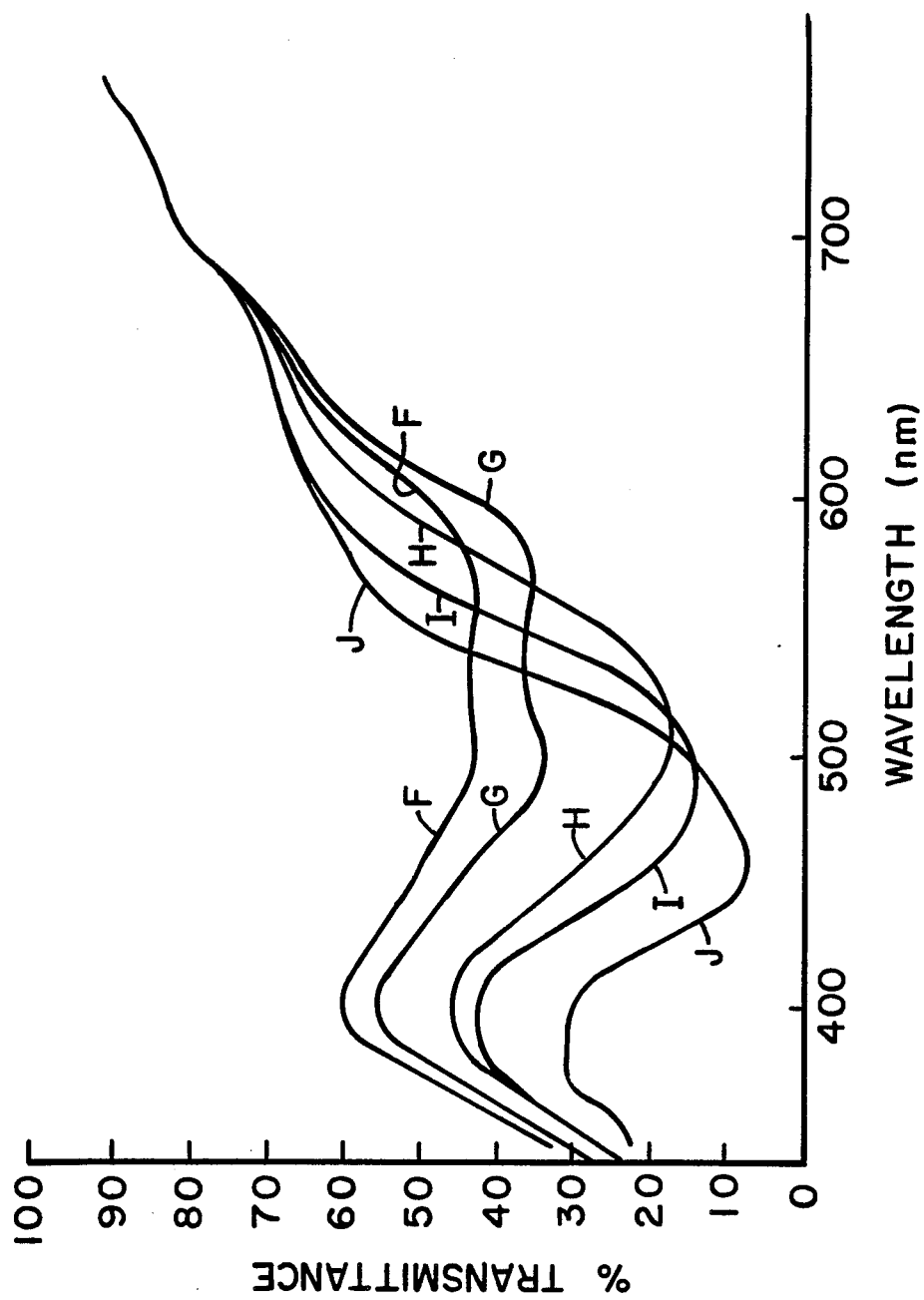
Figure 5:
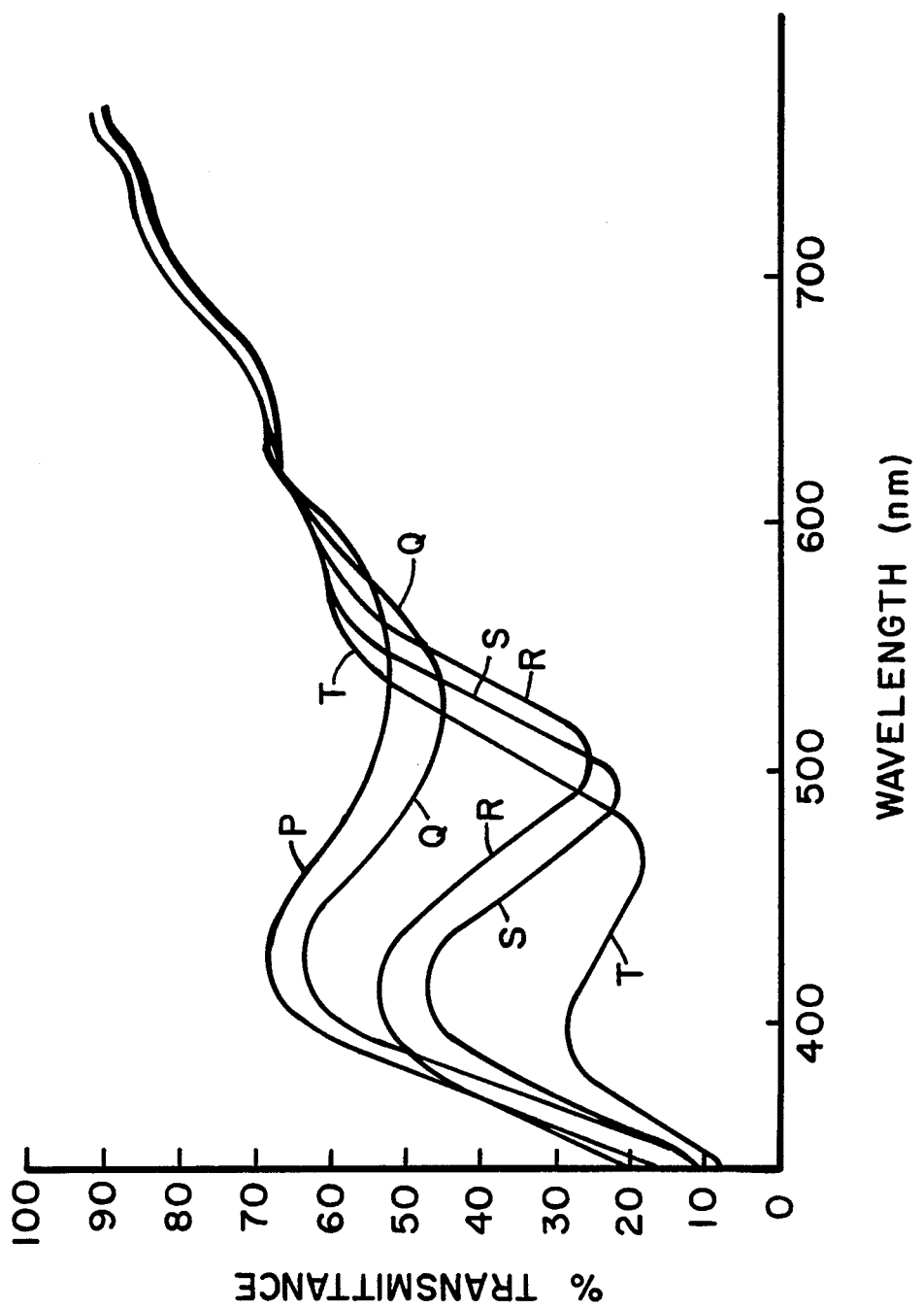

A comparison of FIG. 5 with FIG. 3 illustrates that, in general, the absorption bands described by Curves P-T as not as broad as those of Curves F-J.

EXAMPLE 6

Figure 6:
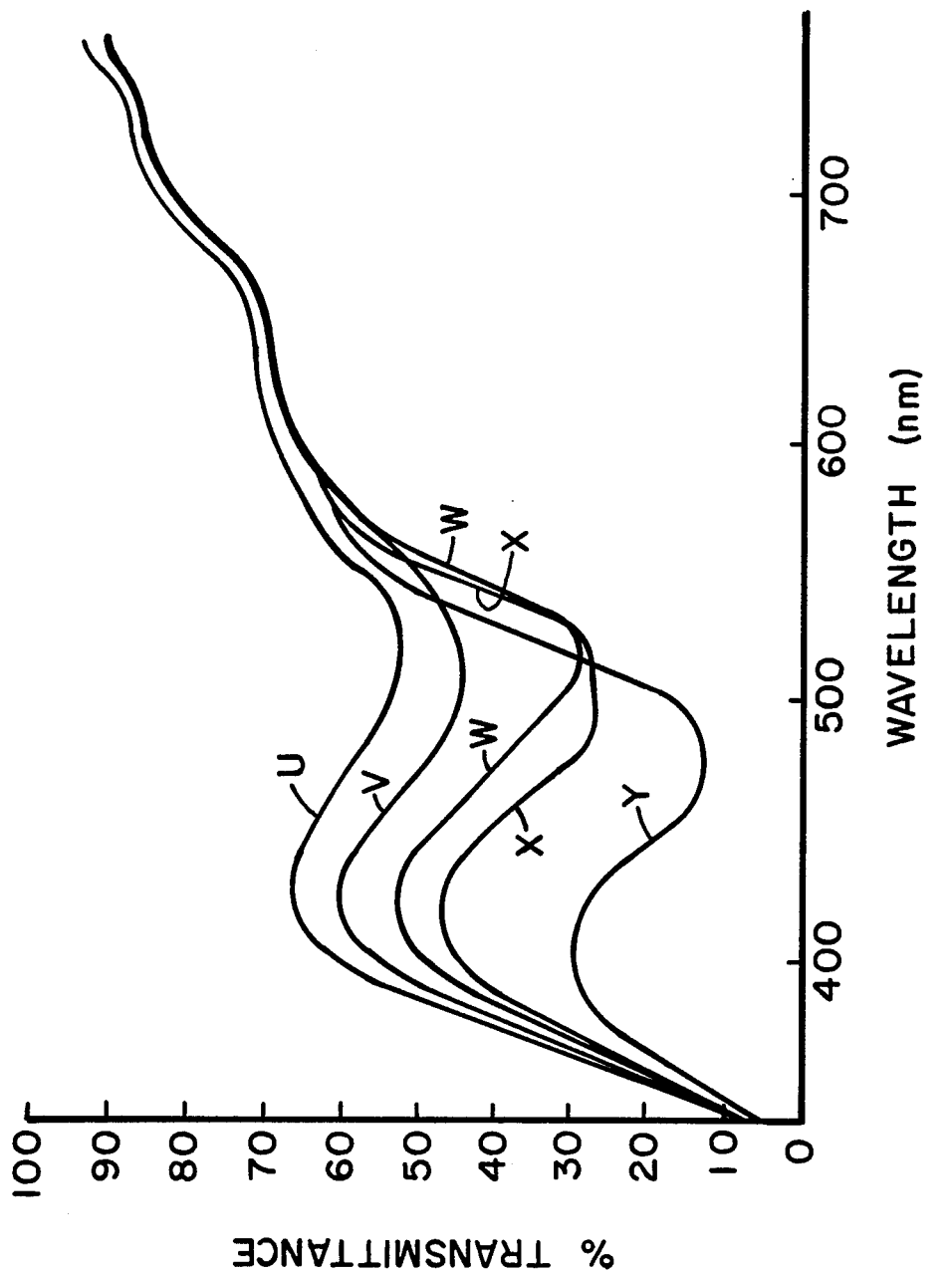

The colored lens blanks prepared in Example 5 were immersed for 16 hours into a bath of molten salt consisting of 40% by weight $NaNO_3$ and 60% by weight $KNO_3$ operating at 400° C. to chemically strengthen the articles. Curves U, V, W, X, and Y of FIG. 6 delineate percent transmittances as a function of wavelength measured on those samples.

A comparison of Curves U-Y with Curves P-T of FIG. 5 illustrates that the chemical strengthening exerted little effect upon the absorption characteristics of the specimens.

EXAMPLE 7

Samples of Corning Code 8097, marketed under the trademark PHOTOGRAY and having the approximate composition recorded above, were immersed for one hour into a bath of molten $NaNO_3$ operating at 400° C. After removal from the bath, rinsing with water, and drying, the specimens were individually fired in a hydrogen atmosphere for 40 minutes at different temperatures. Curves AA, BB, CC, and DD of FIG. 7 define percent transmittances as a function of wavelength for samples fired in hydrogen at 360° C., 380° C., 400° C., and 420° C., respectively.

Figure 7:
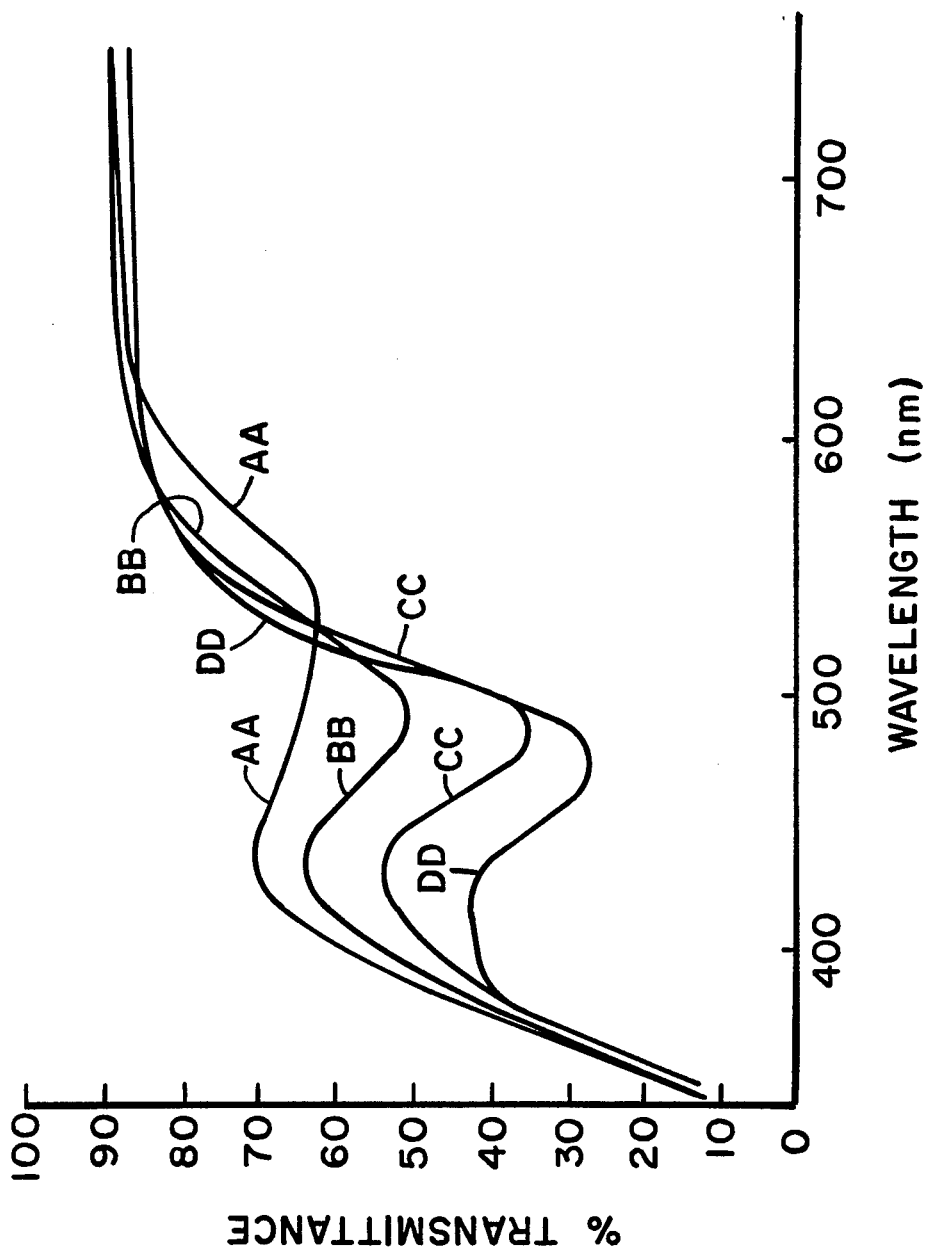

As was explained above, not all photochromic glass compositions are operable in the inventive method. Hence, FIG. 7 illustrates that firing the samples at 380° C., 400° C., and 420° C. in an atmosphere of flowing hydrogen (depicted in Curves BB, CC, and DD) did not produce an absorption band at a wavelength longer than 500 nm. Only at a firing of 360° C. (Curve AA) was the absorption shifted to longer than 500 nm and the extent of that absorption is quite apparently very slight.

An inspection of the composition of Corning Code 8097 reveals a content of $Na_2O$ (1.85% by weight) slightly below the minimum found truly operable in the present invention.

EXAMPLE 8

Figure 8:
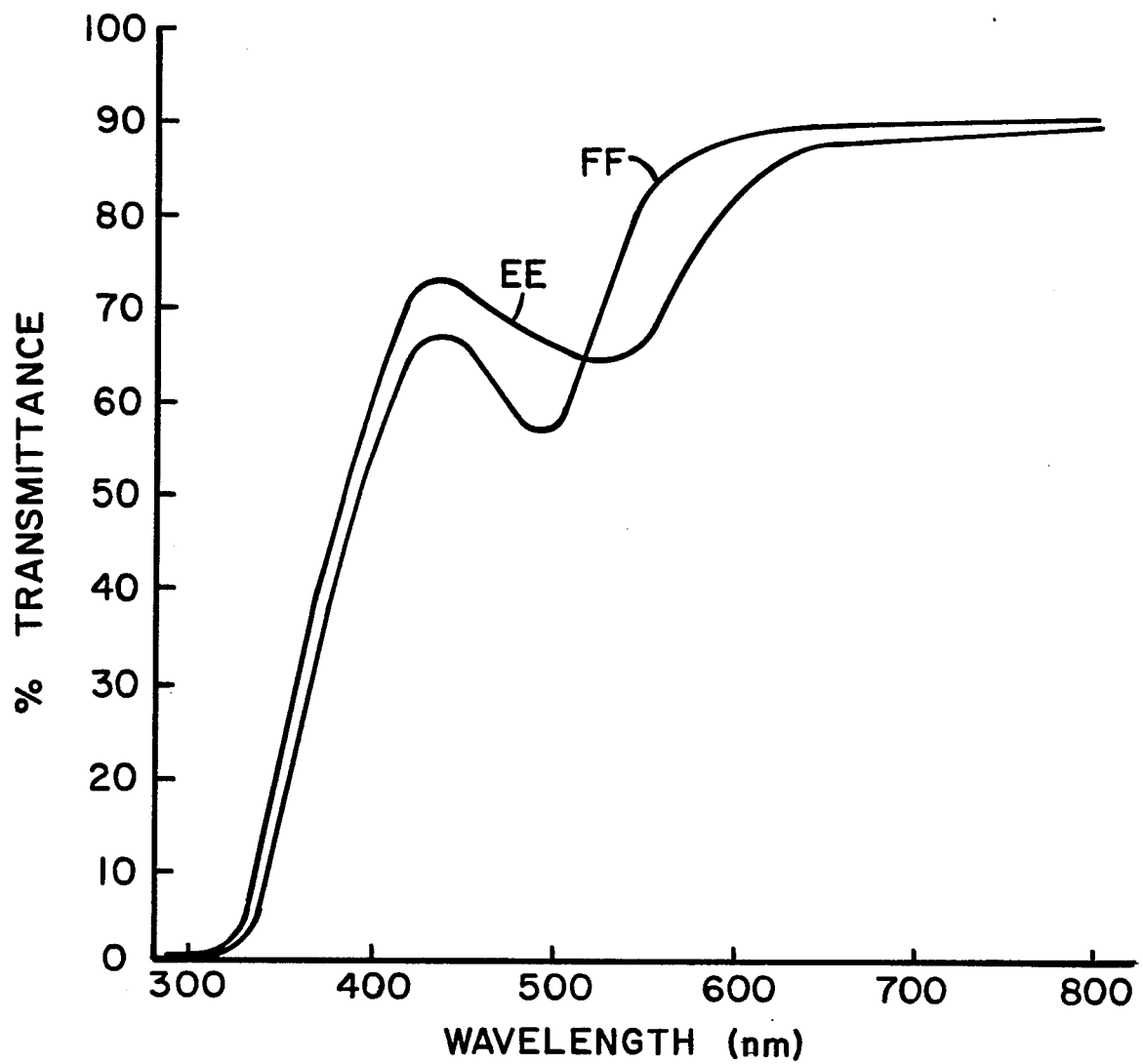

The colored sample prepared in Example 7 by firing in a hydrogen atmosphere at 360° C. was immersed for 16 hours into a bath of molten salt consisting of 40% by weight $NaNO_3$ and 60% by weight $KNO_3$ operating at 400° C. to chemically strengthen the article. Curves EE and FF of FIG. 8 report percent transmittances as a function of wavelength of the sample before and after chemical strengthening, respectively. As is readily apparent from Curve FF, the chemically strengthening process sharply shifted the absorption band to below 500 nm. Hence, the composition of Corning Code 8097 does not yield a coloration which is stable to the effect of chemical strengthening.

EXAMPLE 9

Ophthalmic photochromic lens blanks of Corning Code 8111 glass marketed under the trademark PHOTOGRAY EXTRA were obtained, that glass having the approximate analysis recorded below in weight percent:

| $SiO_2$ | 55.8 | $ZrO_2$ | 4.9 |
|---|---|---|---|
| $Al_2O_3$ | 6.5 | $TiO_2$ | 2.2 |
| $B_2O_3$ | 18.0 | Ag | 0.24 |
| $Li_2O$ | 1.9 | Cl | 0.20 |
| $Na_2O$ | 4.0 | Br | 0.13 |
| $K_2O$ | 5.8 | CuO | 0.011 |

Figure 9:
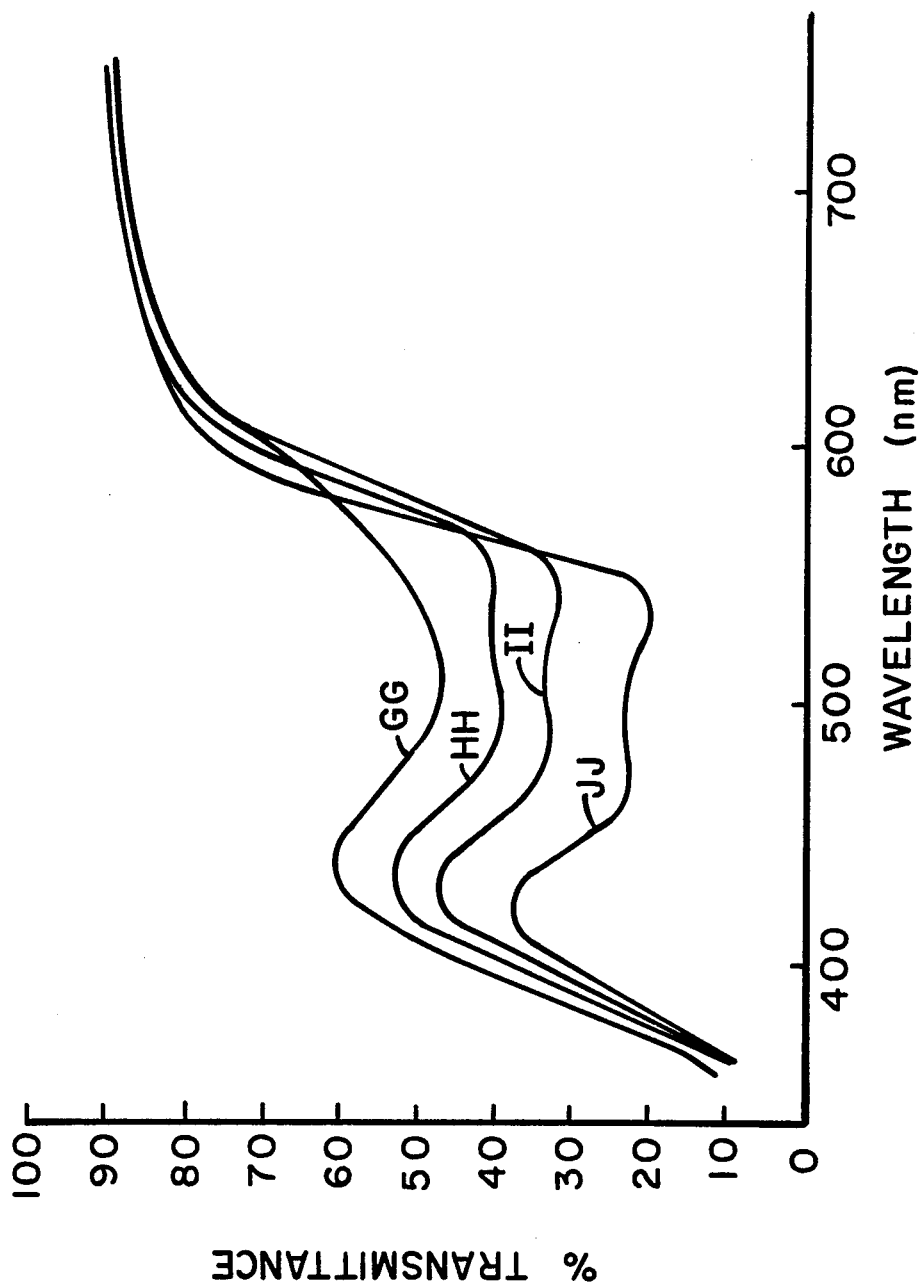

The blanks were ground and polished to yield samples of about 2 mm cross section, and divided into two groups. The first set of samples was fired in a hydrogen atmosphere for 40 minutes at temperatures ranging between 360°–420° C. Curves GG, HH, II, and JJ of FIG. 9 define percent transmittances as a function of wavelength at 360° C., 380° C., 400° C., and 420° C., respectively. As clearly shown, each of the four curves describes an absorption peak at a wavelength longer than 500 nm.

EXAMPLE 10

The second set of 2 mm thick polished samples of Corning Code 8111 discussed above in Example 9 was immersed for one hour into a bath of molten $NaNO_3$ operating at 400° C. After removal from the bath, rinsing with water, and drying, the specimens were fired for 40 minutes in a hydrogen atmosphere at several temperatures. Curves KK, LL, MM, and NN of FIG. 10 delineate percent transmittances as a function of wavelength at 360° C., 380° C., 400° C., and 420° C., respectively.

It is of interest to note that Curves KK–NN illustrate an increased absorption in the region of 530–550 nm. Such phenomenon indicates that, although this glass composition exhibits absorption peaks at wavelengths longer than 500 nm after being fired in a reducing atmosphere, that longer wavelength absorption may be enhanced by immersing the samples for a brief period in a bath of molten $NaNO_3$ prior to the reduction step.

EXAMPLE 11

Figure 10:
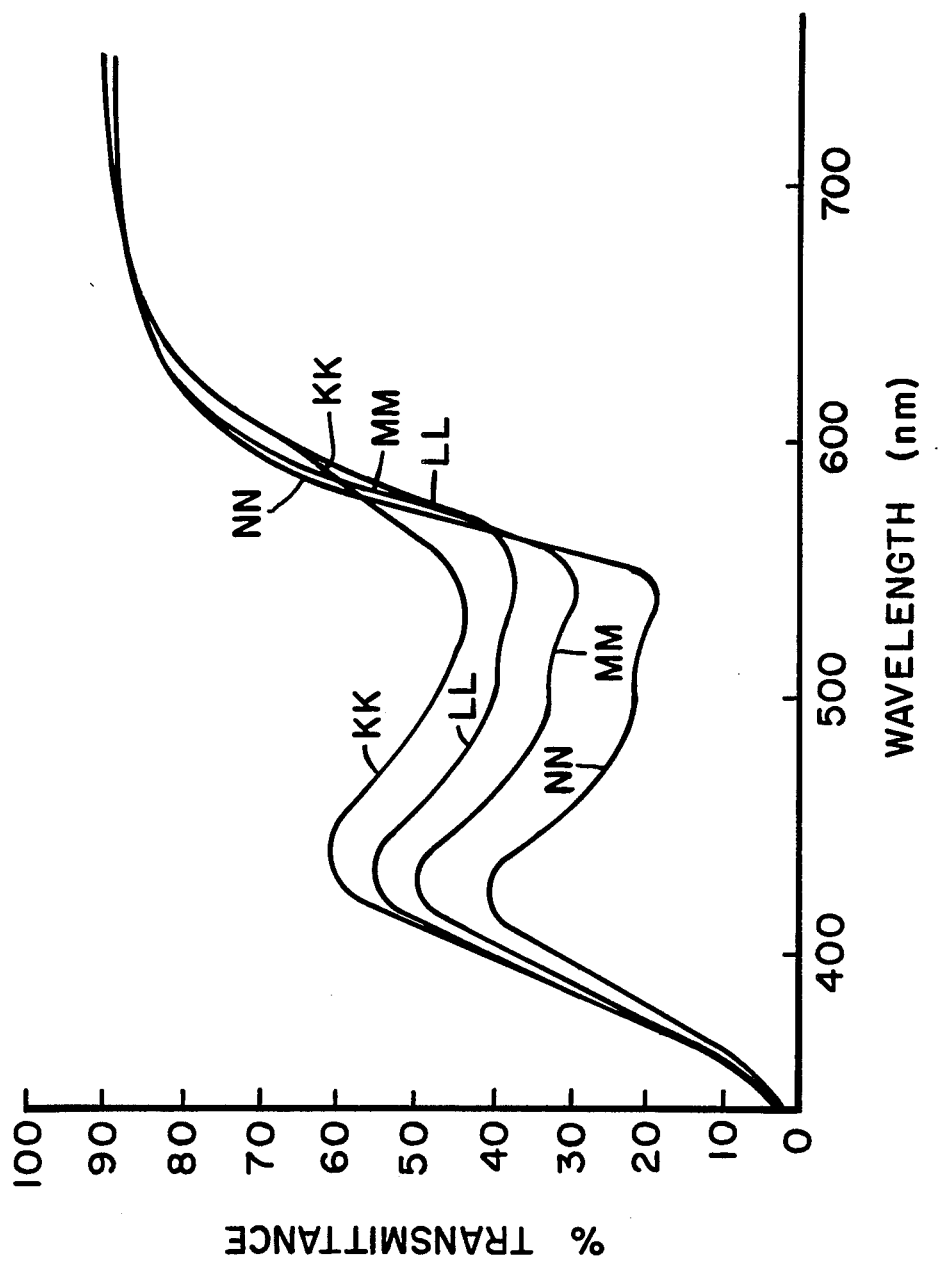
Figure 11:
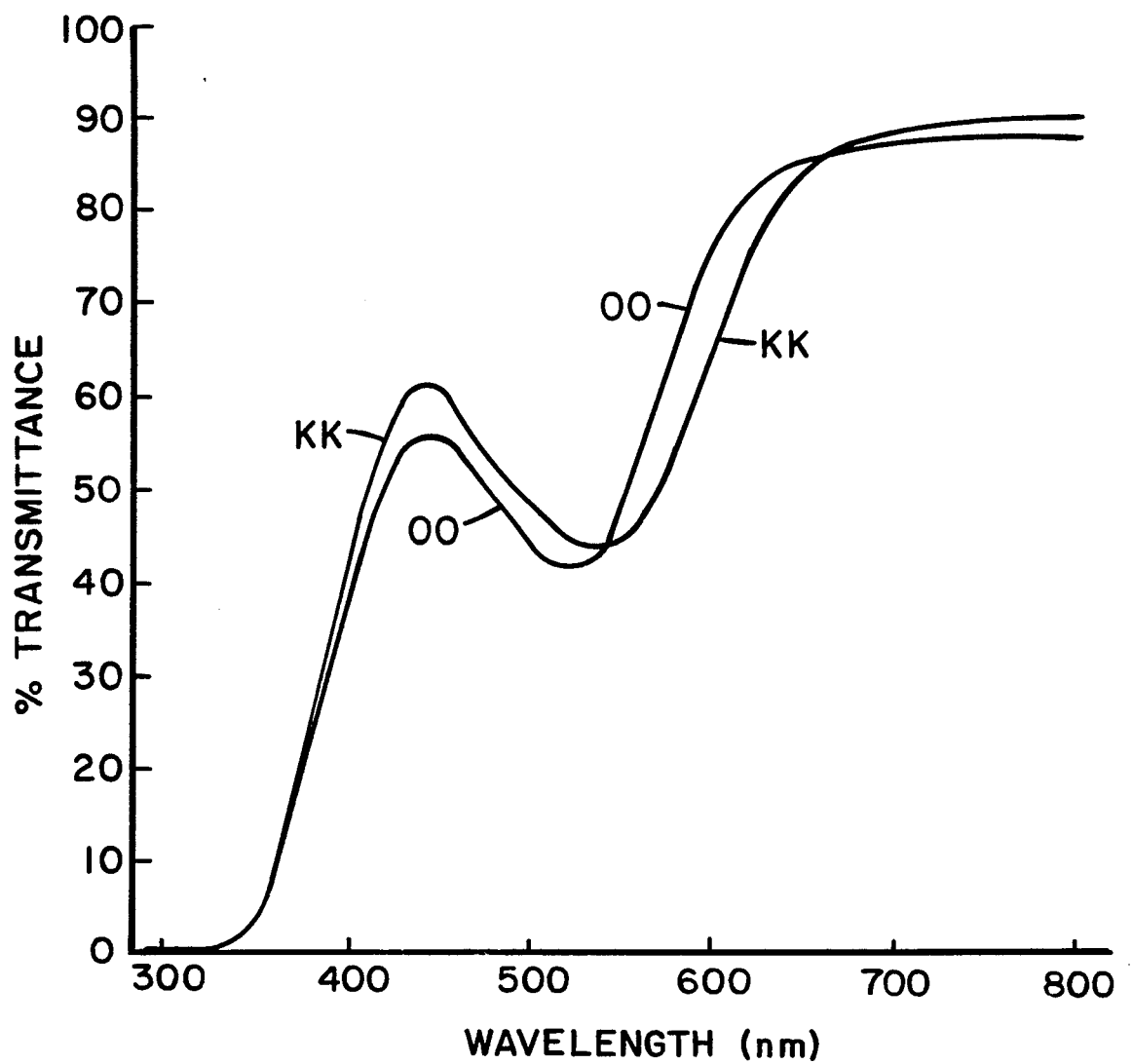

The colored lens blank sample of Example 10 which had been fired in the hydrogen atmosphere at 360° C. (curve KK of FIG. 10) was immersed for 16 hours into a bath of molten 60% $KNO_2$–40% $NaNO_3$ by weight operating at 400° C. Curve OO of FIG. 11 depicts percent transmittances as a function of wavelength as measured on that sample. Curve KK from FIG. 10 is also placed in FIG. 11 for comparison purposes. It will be observed that, whereas the absorption peak has been shifted slightly by the ion exchange reaction to a lower wavelength, it is still at a wavelength longer than 500 nm.

EXAMPLE 12

Lens blanks were obtained of another commercial ophthalmic photochromic glass which had the following approximate analysis in weight percent:

| $SiO_2$ | 17.1 | $ZrO_2$ | 0.77 |
|---|---|---|---|
| $Al_2O_3$ | 27.2 | $TiO_2$ | 0.53 |
| $B_2O_3$ | 13.8 | CaO | 3.1 |
| $P_2O_5$ | 14.6 | Ag | 0.23 |
| $Li_2O$ | 1.45 | Cl | 0.44 |
| $Na_2O$ | 0.12 | Br | 0.23 |
| $K_2O$ | 10.3 | CuO | 0.033 |
| BaO | 9.6 | | |

As can be seen, the $Na_2O$ content of the glass is far below the minimum found operable in the present invention.

Figure 12:
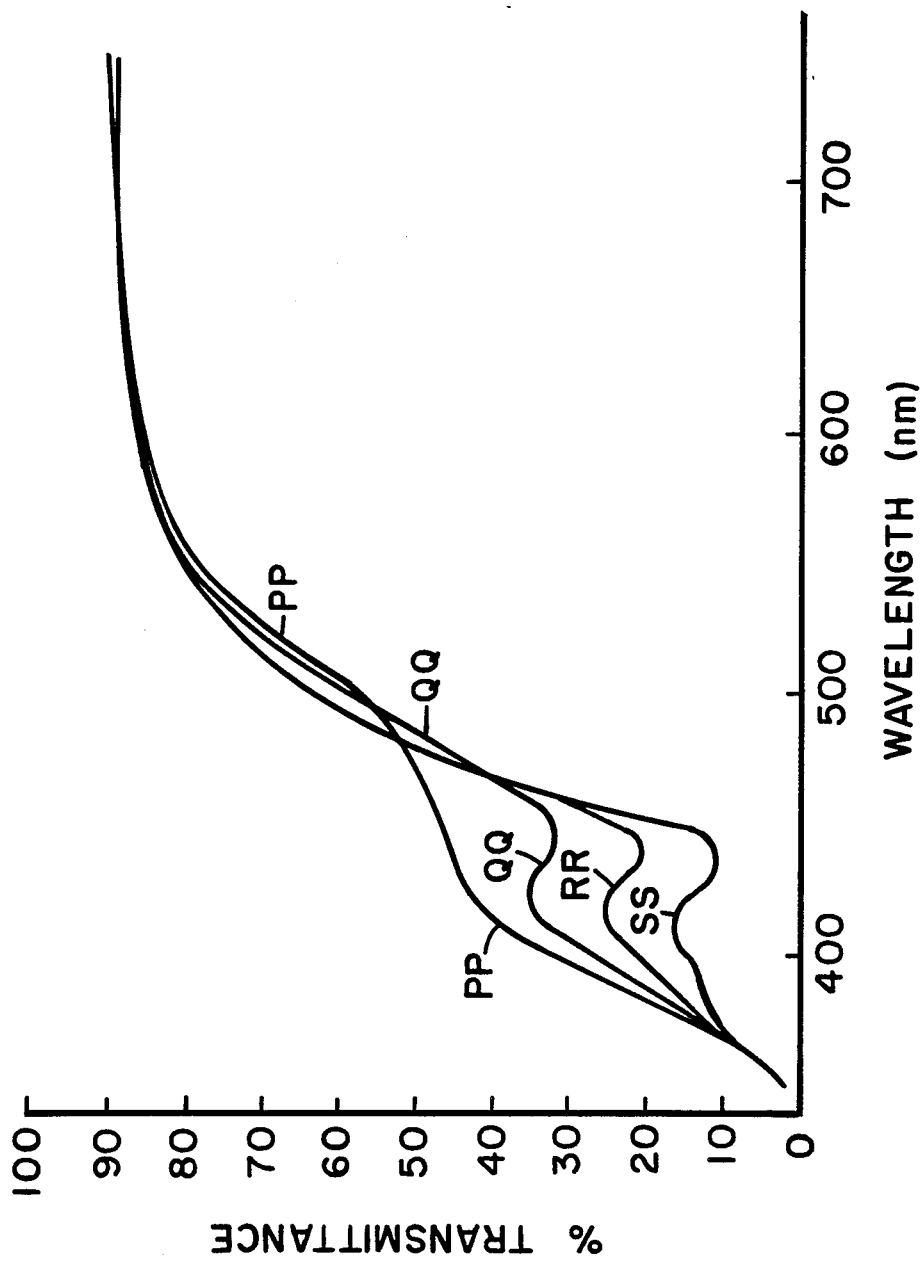

The blanks were ground and polished to produce specimens having a thickness of about 2 mm and separated into two groups. The first group was heated in a hydrogen atmosphere for 40 minutes at temperatures varying from 360°–420° C. Curves PP, QQ, RR, and SS of FIG. 12 report percent transmittances as a function of wavelength at 360° C., 380° C., 400° C., and 420° C., respectively. It is quite apparent from those curves that the absorption peaks manifested by those glasses are at wavelengths considerably shorter than 500 nm.

EXAMPLE 13

Figure 13:
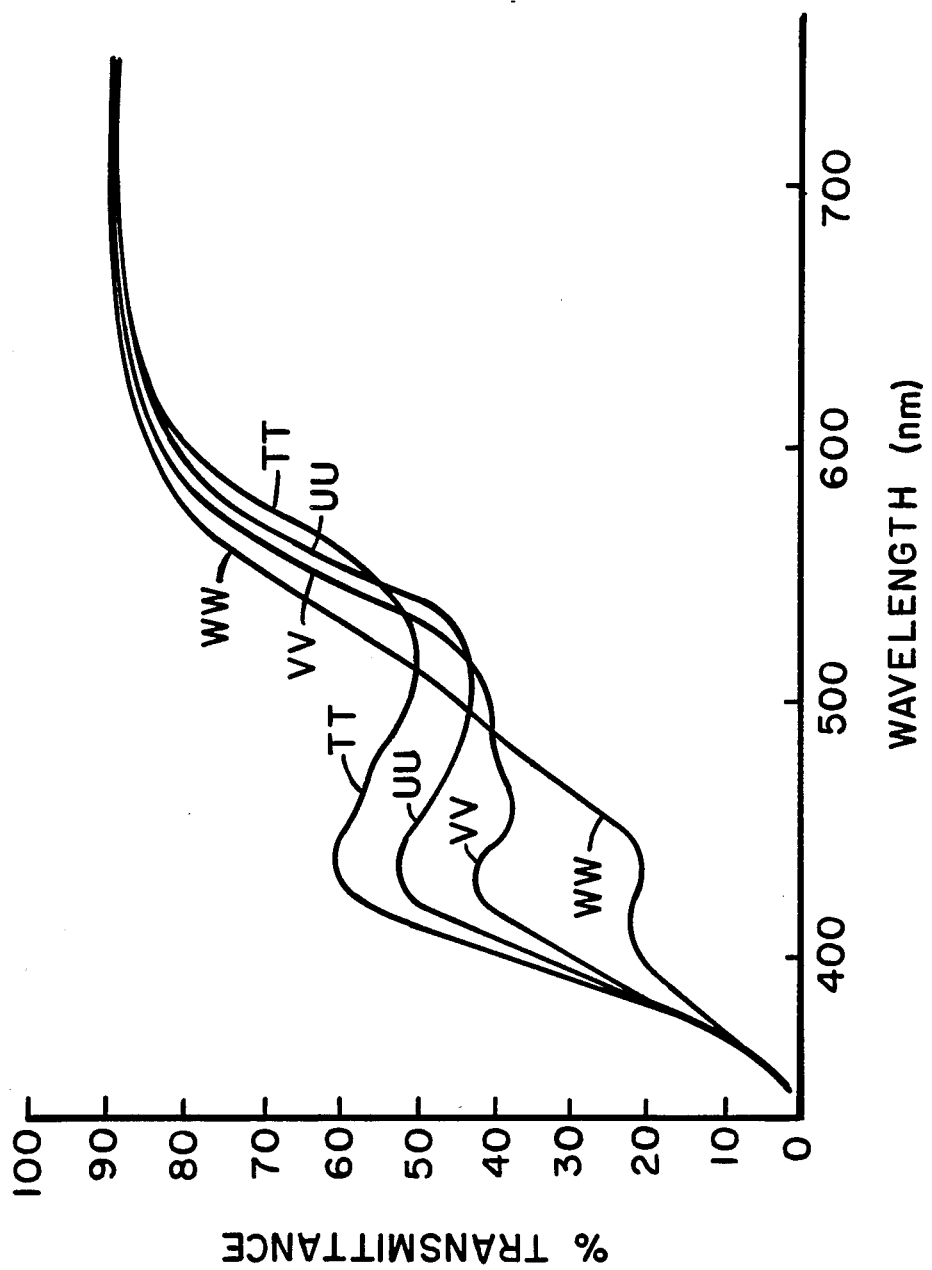

The second group of specimens referred to above in Example 12 was immersed for 60 minutes in a bath of molten $NaNO_3$ operating at 400° C. After removal from the bath, rinsing with water, and drying, the samples were fired for 40 minutes in a hydrogen atmosphere at temperatures ranging from 360°–420° C. Curves TT, UU, VV, and WW of FIG. 13 define percent transmittances as a function of wavelength at 360° C., 380° C., 400° C., and 420° C., respectively. Weak absorption bands at wavelengths longer than 500 nm can be observed in the specimens fired at 360° C. and 380° C., Curves TT and UU, respectively.

EXAMPLE 14

Figure 14:
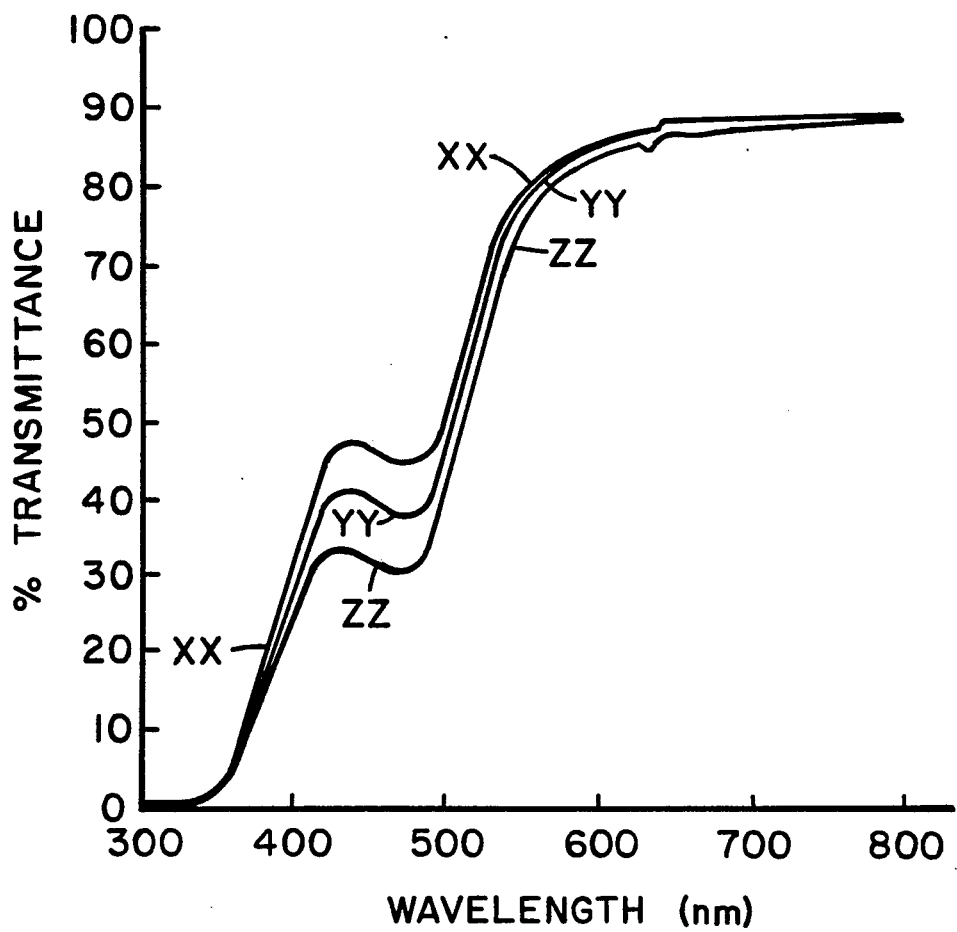

Portions of the samples described in Example 13 which had been fired in the hydrogen atmosphere at 360° C., 380° C., and 400° C. were immersed for 16 hours into a bath of 60% $KNO_3$-40% $NaNO_3$ by weight operating at 400° C. Curves XX, YY and ZZ of FIG. 14 report percent transmittance as a function of wavelength at 360° C., 380° C., and 400° C., respectively. It is quite apparent from those curves that the absorption band has moved to wavelengths below 500 nm. That phenomenon confirms the need for the substantial presence of $Na_2O$ in the original glass composition in order for the present inventive method to be operable even after a subsequent chemical strengthening ion exchange reaction.

EXAMPLE 15

Three samples of an experimental non-prescription photochromic glass were obtained having the following composition, expressed in terms of parts by weight as calculated from the batch (the $Na_2O$, CuO, Ag, Cl, and Br contents as analyzed in the glass are also reported). Because the sum of the individual ingredients closely approximates 100, for all practical purposes the tabulated values may be deemed to reflect weight percent.

| | Calculated | Analyzed |
|---|---|---|
| $SiO_2$ | 59.4 | |
| $B_2O_3$ | 19.7 | |
| $Al_2O_3$ | 9.6 | |
| $Li_2O$ | 2.2 | |
| $Na_2O$ | 2.4 | 2.48 |
| $K_2O$ | 6.3 | |
| PbO | 0.12 | |
| CuO | 0.009 | 0.007 |
| Ag | 0.15 | 0.122 |
| Cl | 0.5 | 0.444 |
| Br | 0.06 | 0.036 |

After grinding and polishing to about a 1.5 mm cross section, the samples were heated for 15 minutes at 625° C. to induce photochromism therein. Thereafter, one sample was immersed for one hour in a bath of molten $NaNO_3$ operating at 400° C. Another sample was immersed for 16 hours in a bath of molten $KNO_3$ operating at 400° C. The third sample did not receive any salt bath treatment.

Figure 15:
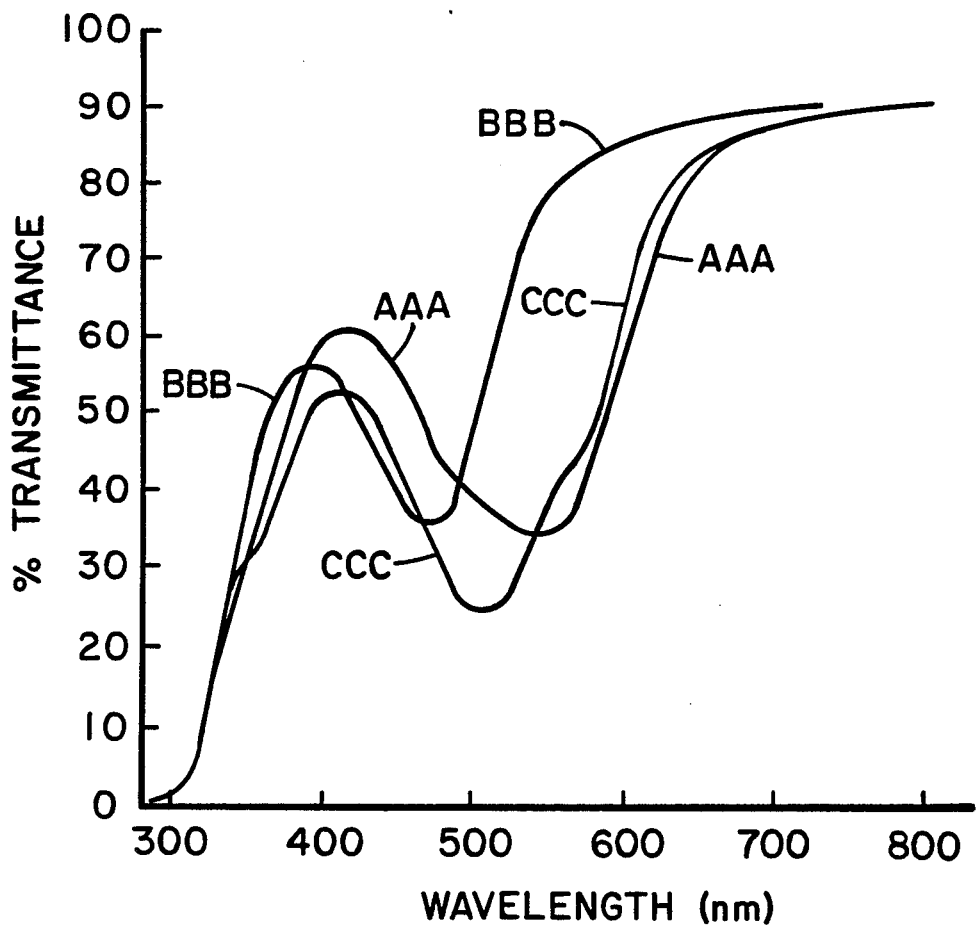

The three specimens were thereafter fired for 40 minutes in a hydrogen atmosphere at 360° C. Curves AAA, BBB, and CCC of FIG. 15 record percent transmittance as a function of wavelength for those samples. Curve AAA reflects the specimen exposed to the $NaNO_3$ salt bath; Curve BBB designates the sample subjected to the $KNO_3$ salt bath, and Curve CCC represents the untreated specimen.

As can be noted from Curve CCC, the control sample exhibited a maximum absorption in the 500-510 nm range. The effect of the $NaNO_3$ salt bath was to shift the absorption maximum to a longer wavelength, viz., about 550 nm (Curve AAA). Finally, immersion in the $KNO_3$ salt bath acted to move the maximum absorption to a shorter wavelength, viz., about 470 nm (Curve BBB). The latter specimen displayed a relatively intense yellow coloration.

EXAMPLE 16

Three samples of another experimental non-prescription photochromic glass were obtained having the following composition, expressed in terms of parts by weight on the oxide basis as calculated from the bath (the $Na_2O$, CuO, Ag, Cl, and Br contents as analyzed in the glass are also recorded). Inasmuch as the total of the individual constituents closely approximates 100, for all practical purposes the reported values may be considered to represent percent by weight.

| | Calculated | Analyzed |
|---|---|---|
| $SiO_2$ | 58.8 | |
| $B_2O_3$ | 19.5 | |
| $Al_2O_3$ | 9.6 | |
| $Li_2O$ | 1.2 | |
| $Na_2O$ | 4.3 | 4.36 |
| $K_2O$ | 6.3 | |
| PbO | 0.12 | |
| CuO | 0.009 | 0.007 |
| Ag | 0.15 | 0.142 |
| Cl | 0.5 | 0.506 |
| Br | 0.06 | 0.047 |

Figure 16:
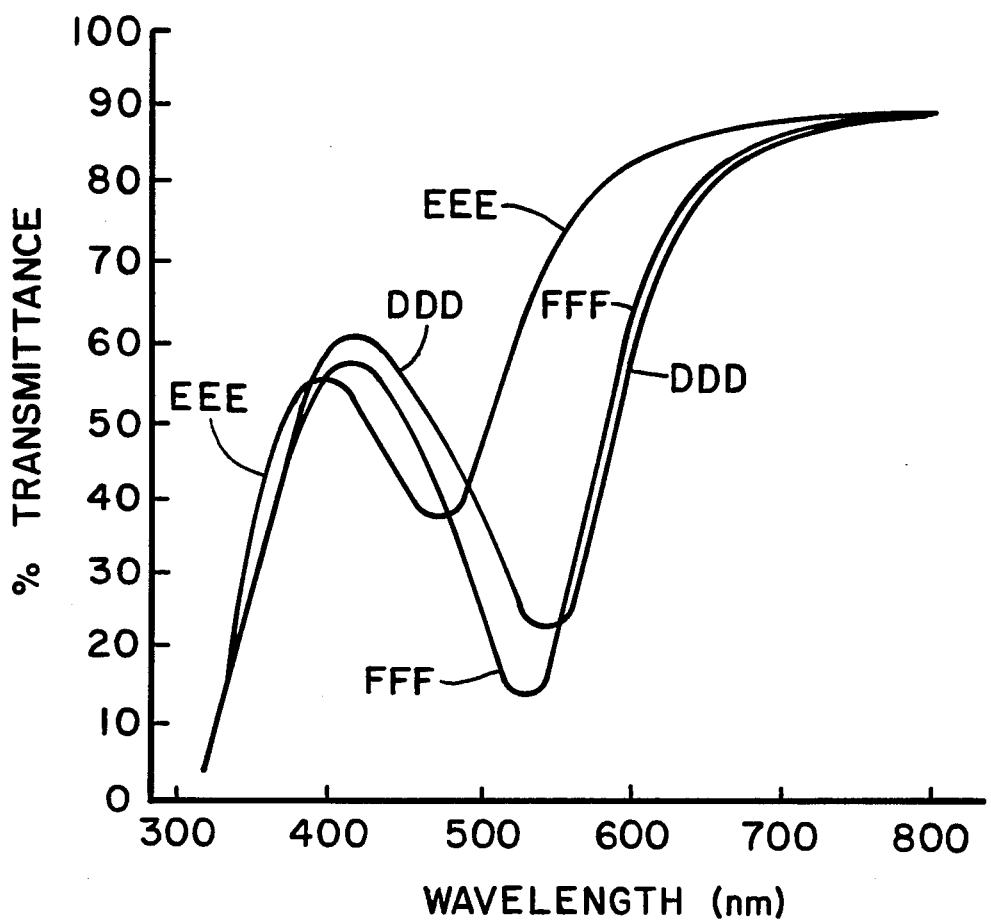

After grinding and polishing to a thickness of about 1.5 mm, the three samples were treated in like manner to the description above in Example 15. Curves DDD, EEE, and FFF of FIG. 16 depict percent transmittance as a function of wavelength for the three samples. Curve DDD signifies the sample immersed into the molten $NaNO_3$; Curve EEE designates the specimen exposed to the molten $KNO_3$; and Curve FFF describes the untreated specimen.

As can be observed from Curve FFF, the control sample demonstrated a maximum absorption at about 525 nm. Immersion in the bath of molten $NaNO_3$ moved the absorption peak to somewhat over 540 nm (Curve DDD). The extent of the shift to a longer wavelenegth brought about by the salt bath treatment can be seen to be less than observed in Example 15. This circumstance is believed to be the result of the higher maximum absorption manifested in the control sample due to the higher $Na_2O$ content of the glass. As evidenced in Curve EEE, immersion of the glass into molten $KNO_3$ caused the absorption peak to be moved to a wavelength below 500 nm, viz., about 465 nm, resulting in a yellow-colored glass. That phenomenon confirms the finding of Example 15 that the desired shift of the absorption band to longer wavelengths cannot be achieved utilizing an external source of $K^+$ ions.

EXAMPLE 17

A sample of the commercial photochromic glass described in Example 1 was obtained and treated for five minutes at 625° C. to induce photochromism. Thereafter, one part of the sample was immersed for 15 minutes into a bath of molten salt consisting of 47 mole % $SrCl_2$ and 53 mole % LiCl operating at 525° C. After removal from the bath, rinsing with water, and drying, the entire sample was fired for 40 minutes in a hydrogen atmosphere at 360° C. Unfortunately, the molten salt attacked the surface of the glass somewhat, thereby depressing the overall transmittance of that portion of the sample immersed in the bath to a minor extent.

Figure 17:
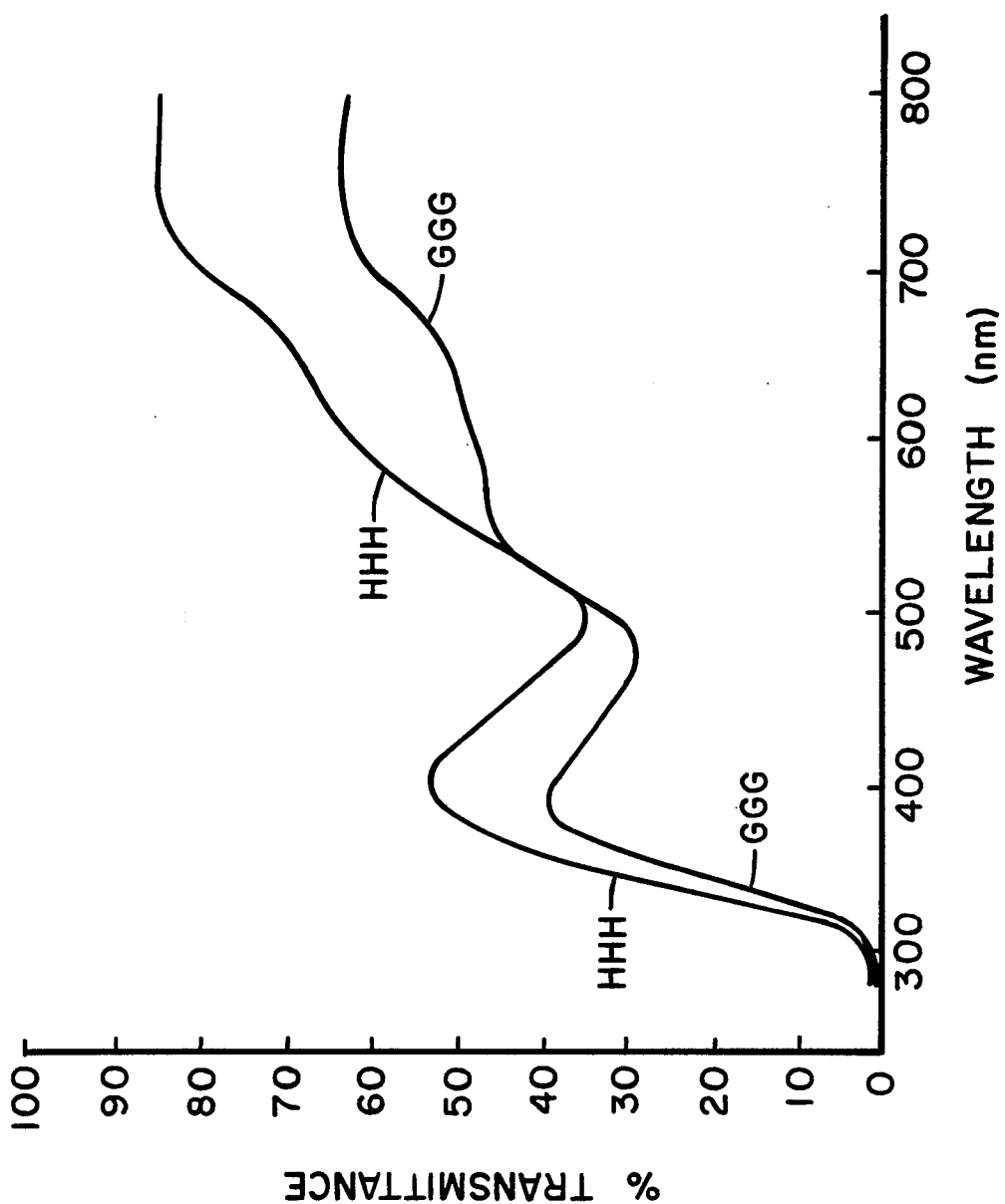
Figure 18:
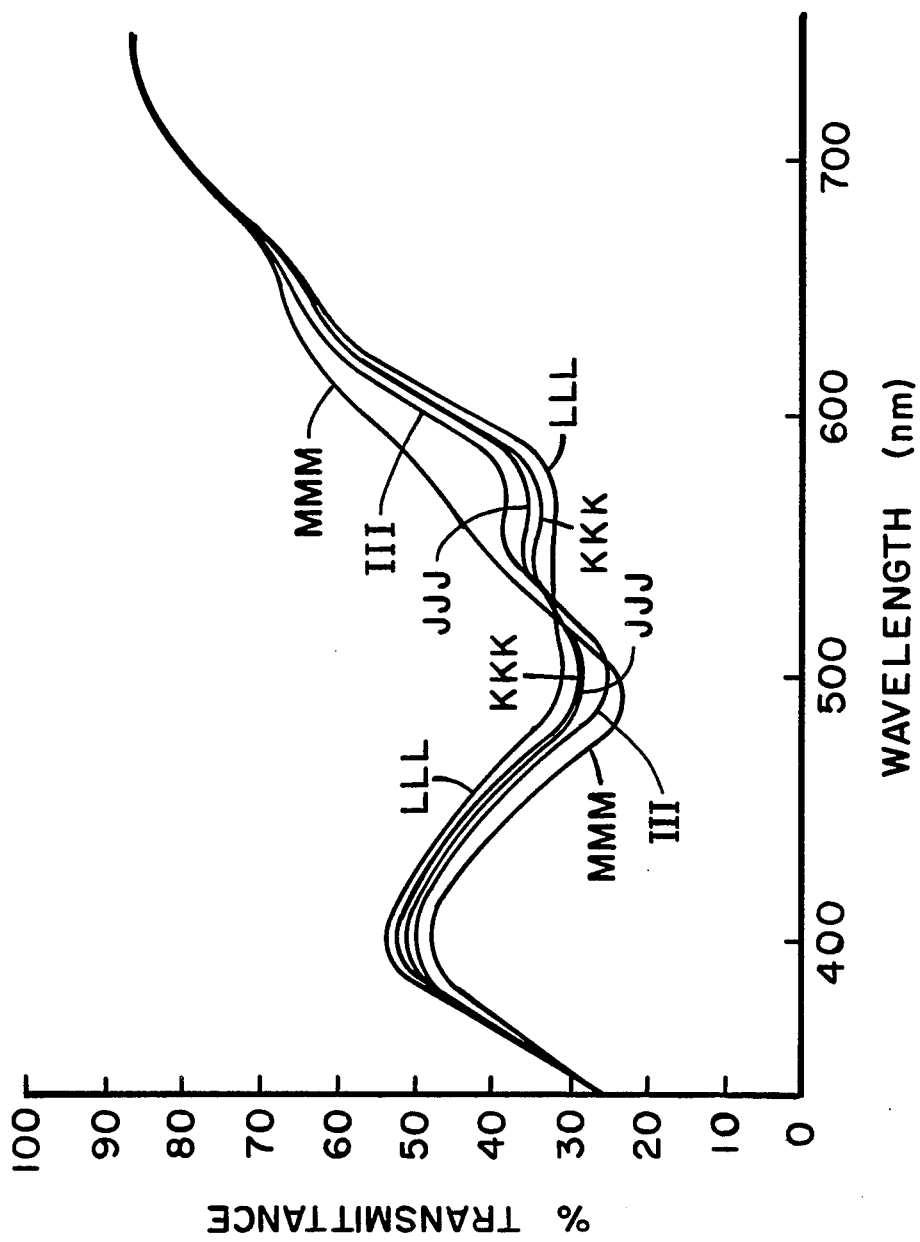
Figure 19:
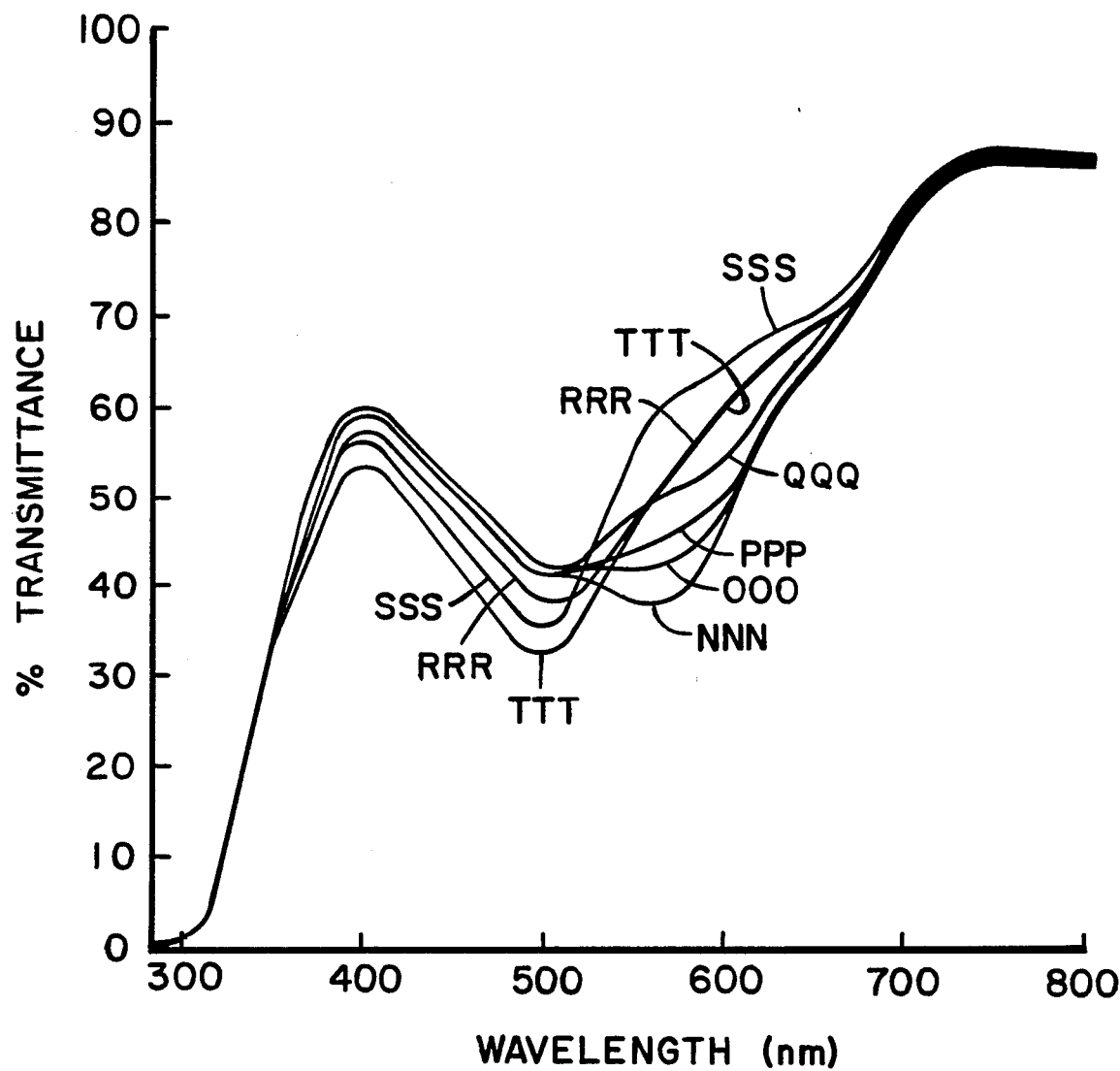

Curves GGG and HHH of FIG. 17 delineate percent transmittances as a function of wavelength of that portion of the sample which had been immersed into the bath of molten $SrCl_2$-$LiCl$ and that portion of the sample which had not been so immersed, respectively. As can be seen from FIG. 17, the untreated part of sample (Curve HHH) exhibited a maximum absorption at a wavelength of about 500 nm. The effect of the exchange of $Li^+$ ions from the salt bath was to shift the absorption band to a shorter wavelength; about 480 nm as defined in Curve GGG.

Hence, in like manner to the $K^+$ ion exchange described above, the $Li^+$ ion exchange reaction moves the absorption peak of the glass to a shorter wavelength and imparts a yellow coloration thereto. Surprisingly, there does not appear to be any linear effect upon the shift of the absorption band with the size of the alkali metal ion employed, e.g., $Li^+$ and $K^+$ ions, in the salt bath treatment prior to the reduction treatment.

EXAMPLE 18

Lens blanks prepared from the commercial glass sheet referred to above in Example 1, and which had been made photochromic through a commercial simultaneous heat treatment-sag process, were separately immersed for times of 5, 15, 30, and 60 minutes in a bath of molten $NaNO_3$ operating at 425° C. After removal from the bath, rinsing with water, and drying, the blanks were exposed to an atmosphere of flowing hydrogen for 40 minutes at 380° C. Curves III, JJJ, KKK, and LLL delineate percent transmittances as a function of wavelength for the lens blanks immersed in the bath of molten $NaNO_3$ for periods of 5, 15, 30, and 60 minutes, respectively. Curve MMM records percent transmittances as a function of wavelength for a sample which had been subjected to the hydrogen atmosphere treatment, but was not exposed to the bath of molten $NaNO_3$.

A comparison of the control sample (Curve MMM) with the other samples clearly indicates that the absorption band can be shifted to a longer wavelength through an ion exchange reaction of as short a time as five minutes. Longer immersion times in the molten $NaNO_3$ accentuate the depth of the absorption and are effective in tailoring the color obtained in the glass.

EXAMPLE 19

Lens blanks prepared from the commercial glass sheet described above in Example 1, and which had been made photochromic through a commercial simultaneous heat treatment sag process, were separately immersed for one hour in the following baths of molten salts operating at 400° C.: 100% $NaNO_3$; 80% by weight $NaNO_3$-20% by weight $KNO_3$; 60% by weight $NaNO_3$-40% by weight $KNO_3$; 40% by weight $NaNO_3$-60% by weight $KNO_3$; 20% by weight $NaNO_3$-80% by weight $KNO_3$; and 100% $KNO_3$. After removal from the baths, rinsing with water and drying, the blanks were heated in an atmosphere of flowing hydrogen for 40 minutes at 360° C. Curves NNN, OOO, PPP, QQQ, RRR, and SSS depict percent transmittances as a function of wavelength for the lens blanks immersed in the salt baths in the order recited above. Curve TTT reflects a glass blank fired in a hydrogen atmosphere for 40 minutes at 360° C. with no prior ion exchange.

As can be observed from the Curves, the diffusion of $Na^+$ ions is sufficiently more rapid than $K^+$ ions such that the desired exchange of $Na^+$ ions for $Li^+$ ions, and $K^+$ ions when present in the glass, to shift the absorption band to longer wavelengths in a bath of 40% $NaNO_3$-60% $KNO_3$ can be achieved.

We claim:

1. A photochromic glass article which has silver halide as the photochromic agent, which contains at least 1% by weight $Li_2O$, at least 2% by weight $Na_2O$, and at least 6% by weight $Li_2O + Na_2O + K_2O$, and which has a surface permanent coloration zone, said surface coloration zone consisting of a first layer of coloration overlying a second layer of different coloration, said first layer having an absorption peak at a longer wavelength than said second layer, at least said first layer exhibiting an absorption band between about 510–580 nm.

2. A photochromic glass article according to claim 1 wherein said surface coloration zone is in the form of a gradient or stepped variation across the surface of the article.

* * * * *